(12) United States Patent
Gross

(10) Patent No.: US 11,433,954 B1
(45) Date of Patent: Sep. 6, 2022

(54) SYSTEM FOR REDUCING AERODYNAMIC DRAG FORCES ON A TRACTOR-TRAILER VEHICLE

(71) Applicant: William Leo Gross, Galesburg, MI (US)

(72) Inventor: William Leo Gross, Galesburg, MI (US)

(73) Assignee: William Leo Gross, Galesburg, MI (US)

( * ) Notice: Subject to any disclaimer, the term of this patent is extended or adjusted under 35 U.S.C. 154(b) by 0 days.

(21) Appl. No.: 17/712,643

(22) Filed: Apr. 4, 2022

Related U.S. Application Data

(63) Continuation of application No. PCT/US2021/053935, filed on Oct. 7, 2021.

(51) Int. Cl.
*B62D 35/00* (2006.01)
*B62D 37/02* (2006.01)

(52) U.S. Cl.
CPC ........... *B62D 35/004* (2013.01); *B62D 37/02* (2013.01)

(58) Field of Classification Search
CPC .............................. B62D 35/004; B62D 37/02
See application file for complete search history.

(56) References Cited

U.S. PATENT DOCUMENTS

| | | | | |
|---|---|---|---|---|
| 3,977,716 A | * | 8/1976 | Whited | B62D 35/001 105/1.1 |
| 4,142,755 A | * | 3/1979 | Keedy | B62D 35/001 296/180.2 |
| 4,257,641 A | * | 3/1981 | Keedy | B62D 35/001 296/180.4 |
| 4,427,229 A | * | 1/1984 | Johnson | B62D 35/004 52/2.18 |
| 4,451,074 A | * | 5/1984 | Scanlon | B62D 35/001 296/180.4 |
| 4,458,936 A | * | 7/1984 | Mulholland | B62D 35/001 296/180.4 |
| 4,601,508 A | * | 7/1986 | Kerian | B62D 35/004 296/180.4 |
| 4,688,841 A | * | 8/1987 | Moore | B62D 35/001 296/180.4 |
| 4,702,509 A | * | 10/1987 | Elliott, Sr. | B62D 35/004 137/543 |
| 4,741,569 A | * | 5/1988 | Sutphen | B62D 35/004 296/180.4 |

(Continued)

FOREIGN PATENT DOCUMENTS

CN 106828623 A * 6/2017 ........... B62D 35/004

*Primary Examiner* — Lori L Lyjak
(74) *Attorney, Agent, or Firm* — Polsinelli PC

(57) ABSTRACT

A vehicle includes a first trailer having a rear end, and a second trailer having a front. The second trailer is coupled to the first trailer. The vehicle also includes at least one flexible membrane that includes a perimeter coupled to the rear end. A seal is formed between the perimeter and the rear end. The vehicle further includes a pressurization source coupled to the vehicle, and at least one port defined in and extending through the rear end. The at least one port is enclosed by the perimeter and in fluidic communication with the pressurization source. In a deployed profile, the at least one flexible membrane extends between the rear end of the first trailer and the front of the second trailer.

20 Claims, 26 Drawing Sheets

(56) References Cited

U.S. PATENT DOCUMENTS

| | | | | |
|---|---|---|---|---|
| 4,978,162 | A * | 12/1990 | Labbe | B62D 35/004 296/180.2 |
| 5,058,945 | A * | 10/1991 | Elliott, Sr. | B62D 35/001 296/180.1 |
| 5,236,347 | A * | 8/1993 | Andrus | B62D 35/004 296/180.4 |
| 6,409,252 | B1 * | 6/2002 | Andrus | B62D 35/004 296/180.1 |
| 6,467,833 | B1 * | 10/2002 | Travers | B62D 35/004 296/180.1 |
| 9,371,097 | B1 * | 6/2016 | Conny | B62D 35/004 |
| 10,850,780 | B1 * | 12/2020 | Gross | B62D 35/001 105/1.1 |
| 10,974,771 | B1 * | 4/2021 | Gross | B62D 35/004 296/180.4 |
| 10,974,772 | B1 * | 4/2021 | Gross | B62D 35/004 296/180.1 |
| 2006/0273625 | A1 * | 12/2006 | Andrus | B62D 35/004 296/180.1 |
| 2010/0231001 | A1 * | 9/2010 | Mracek | B62D 35/004 296/180.4 |

* cited by examiner

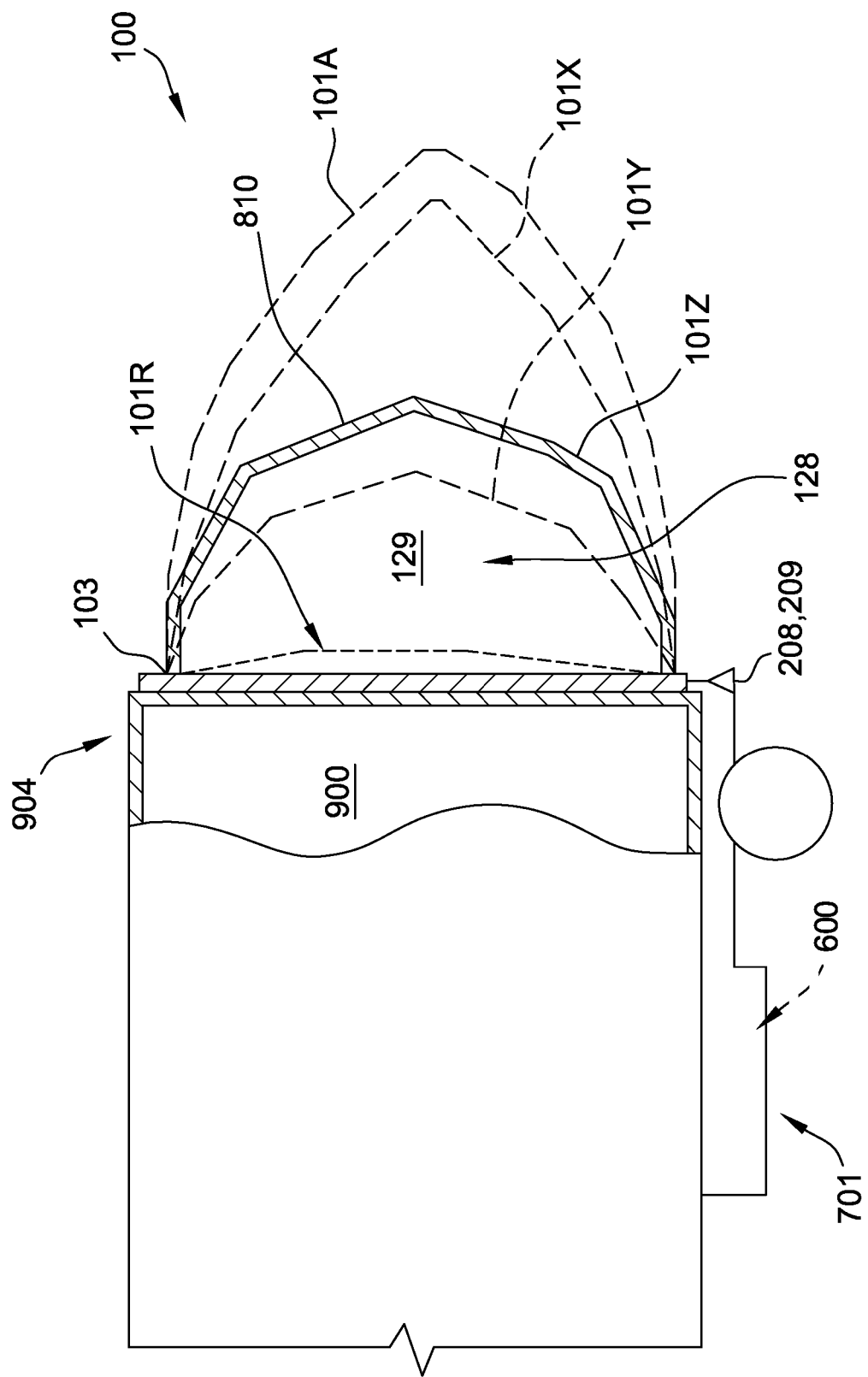

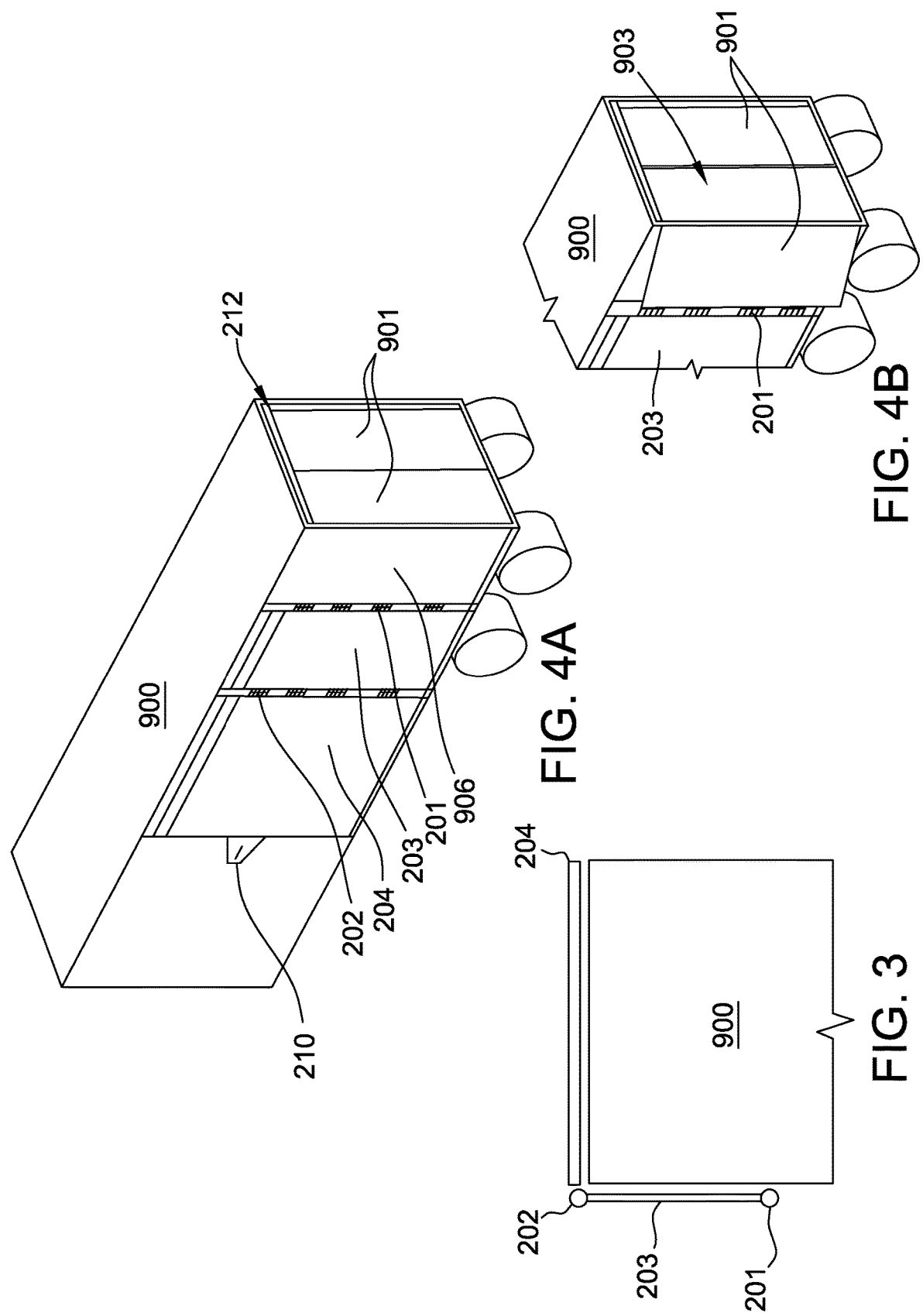

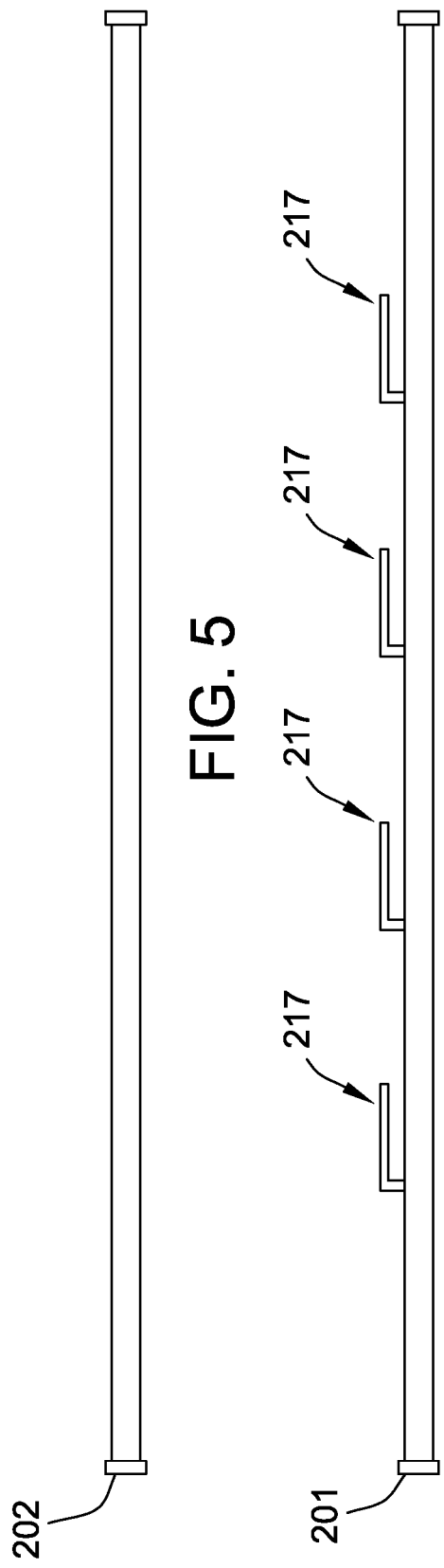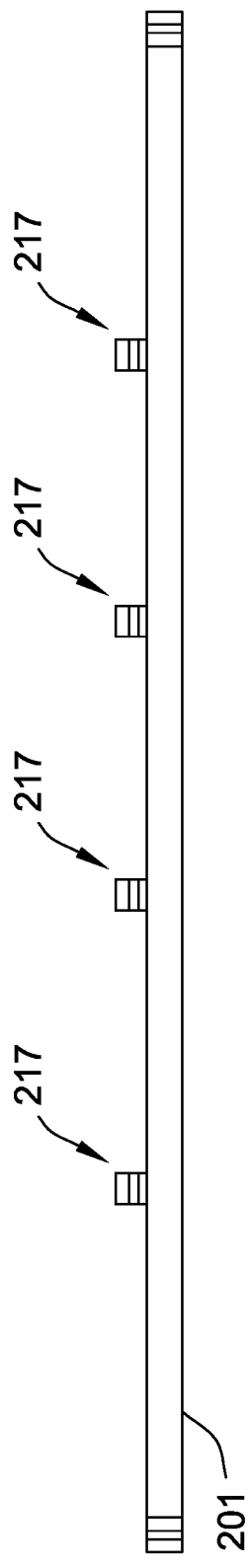

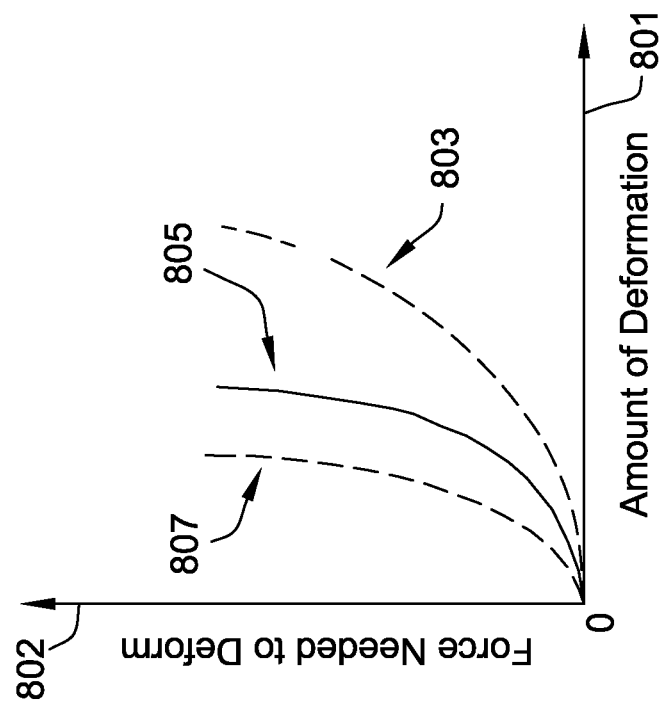
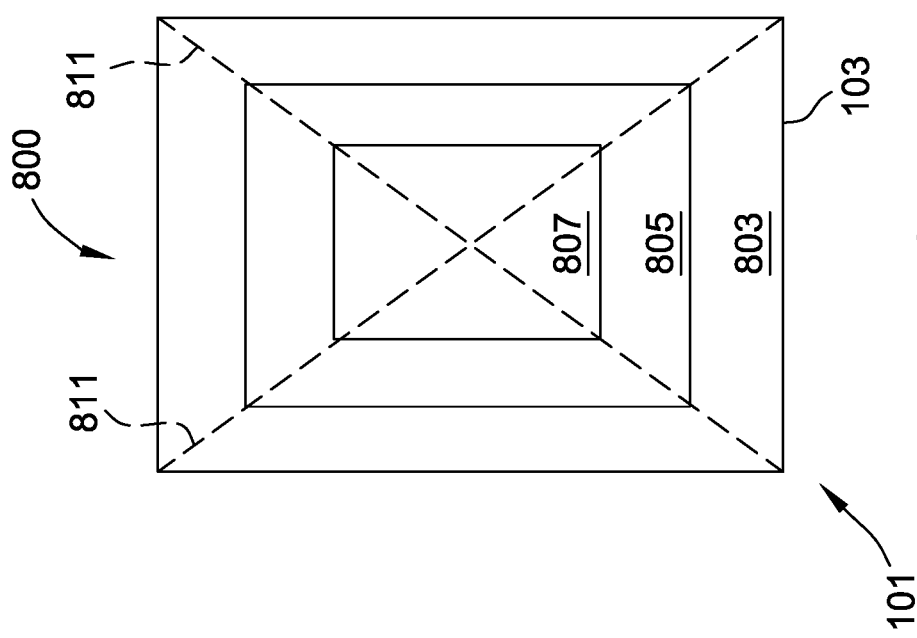
FIG. 21
FIG. 20

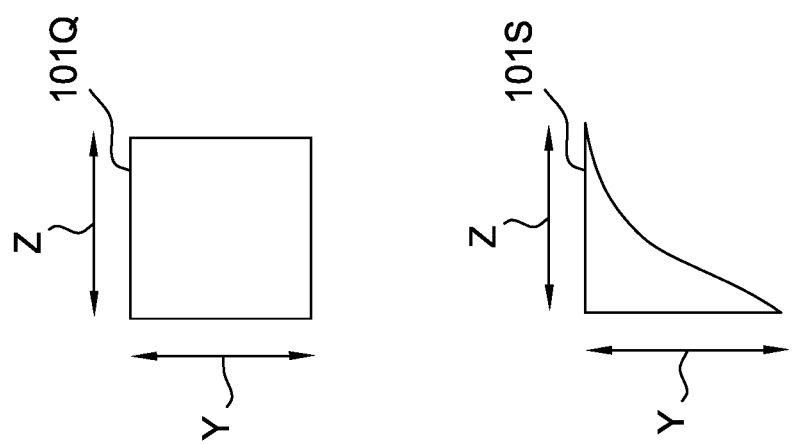
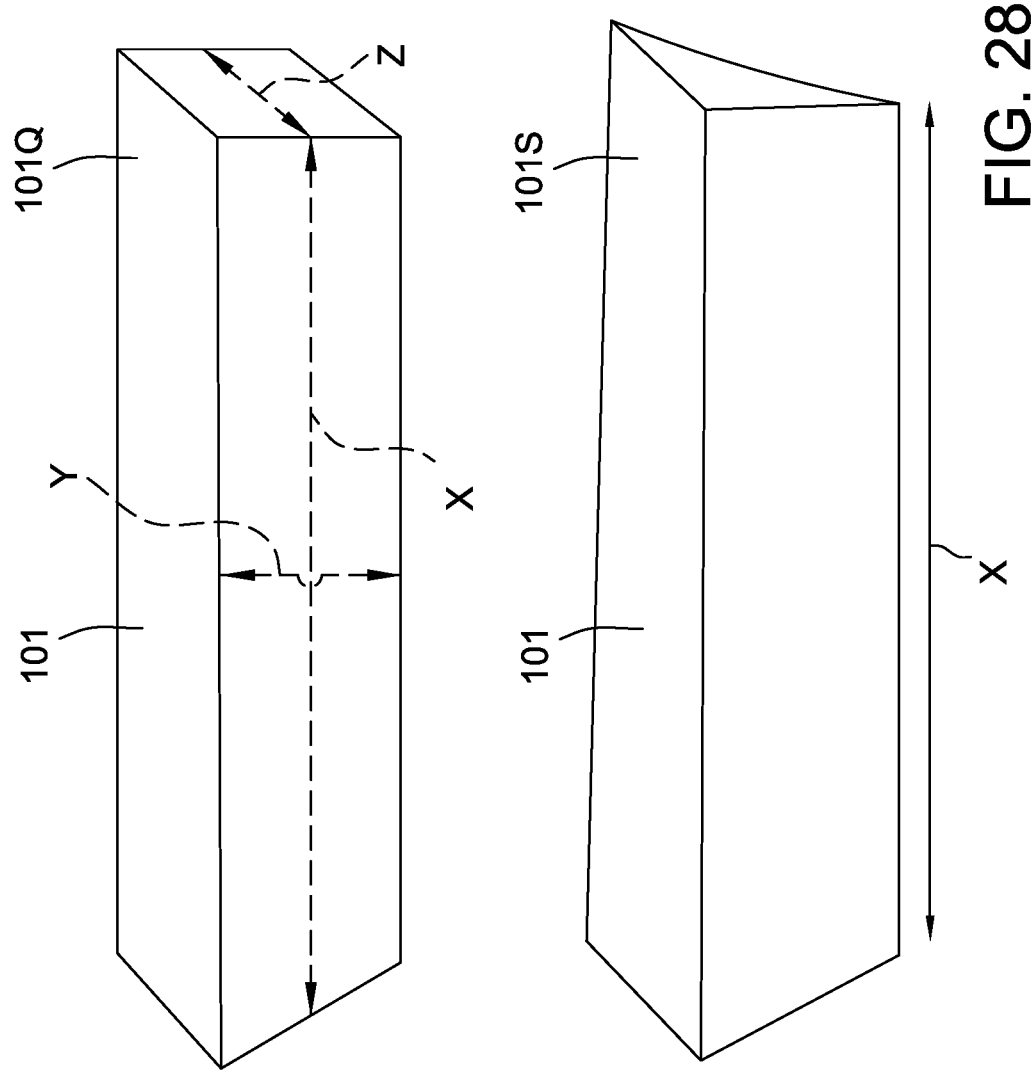
FIG. 28

SYSTEM FOR REDUCING AERODYNAMIC DRAG FORCES ON A TRACTOR-TRAILER VEHICLE

CROSS-REFERENCE TO RELATED APPLICATIONS

This application is a continuation of, and claims priority to, PCT Patent Application Serial No. PCT/US2021/053935 filed Oct. 7, 2021 for SYSTEM FOR REDUCING AERODYNAMIC DRAG FORCES ON A TRACTOR-TRAILER VEHICLE, the disclosure of which is hereby incorporated by reference in its entirety.

BACKGROUND

The field of the disclosure relates generally to systems for reducing aerodynamic drag forces on a tractor-trailer vehicle, and more particularly, to a flexible membrane that is actively deployable to create a pre-selected tapered aerodynamic shape, projecting rearward from the rear of the trailer, to alter an aerodynamic profile of the trailer.

Fuel usage is a major driver of transport costs and also has an environmental impact. At least some known vehicles used for transportation, such as tractor trailers, include blunt-shaped rear surface profiles that tend to induce vortices in air traveling around and past the vehicle. These vortices create aerodynamic drag forces on the vehicle that reduce fuel efficiency, and therefore increase transport costs and environmental impacts. Similar drag effects may occur between the tractor unit and the trailer, between trailers of a double-trailer unit, and/or around the underside of the trailer.

Some known systems attempt to reduce aerodynamic drag by altering the rear profile of the vehicle through the use of fixed or selectively deployable rigid panels at the rear of the vehicle. However, because a shape of the panels is fixed, such systems have limited, if any, capability to adjust to different operating conditions (e.g., different speeds, different cross-winds) that may be encountered by the vehicle. Accordingly, drag reduction is at best sub-optimal during substantial periods of operation of the vehicle.

Other known systems attempt to reduce aerodynamic drag by altering the rear profile of the vehicle through the use of a flexible air bag deployable at the rear of the vehicle. Air captured at the front or sides of the vehicle at speed is routed into the bag to inflate the bag. However, because a shape of the bag is determined by an air flow and pressure essentially fixed by the speed of the vehicle, such systems again have limited capability to adjust to different operating conditions.

Accordingly, a system that is capable of actively changing the rear profile of the vehicle among a number of different shapes, actuated in a fashion that is independent of vehicle speed, would find utility.

BRIEF DESCRIPTION

In one aspect, a vehicle is provided. The vehicle includes a tractor unit having a rear end, and a trailer having a front. The trailer is coupled to the tractor unit. The vehicle also includes at least one flexible membrane that includes a perimeter coupled to the rear end. A seal is formed between the perimeter and the rear end. The vehicle further includes a pressurization source coupled to the vehicle, and at least one port defined in and extending through the rear end. The at least one port is enclosed by the perimeter and in fluidic communication with the pressurization source. In a deployed profile, the at least one flexible membrane extends between the rear end of the tractor unit and the front of the trailer.

In another aspect, a vehicle is provided. The vehicle includes a first trailer having a rear end, and a second trailer having a front. The second trailer is coupled to the first trailer. The vehicle also includes at least one flexible membrane that includes a perimeter coupled to the rear end. A seal is formed between the perimeter and the rear end. The vehicle further includes a pressurization source coupled to the vehicle, and at least one port defined in and extending through the rear end. The at least one port is enclosed by the perimeter and in fluidic communication with the pressurization source. In a deployed profile, the at least one flexible membrane extends between the rear end of the first trailer and the front of the second trailer.

In another aspect, a vehicle is provided. The vehicle includes a trailer having a bottom and at least one wheel extending from the bottom. The vehicle also includes at least one flexible membrane that includes a perimeter coupled to the bottom. A seal is formed between the perimeter and the bottom. The vehicle further includes a pressurization source coupled to the vehicle, and at least one port defined in and extending through the bottom. The at least one port is enclosed by the perimeter and in fluidic communication with the pressurization source. In a deployed profile, the at least one flexible membrane extends from the bottom of the trailer towards a road surface.

BRIEF DESCRIPTION OF THE DRAWINGS

FIG. 2 is a schematic sectional elevation view of a plurality of deployed profiles of the flexible membrane deployment system of FIG. 1;

FIG. 3 is a schematic bottom view of a rear portion of the vehicle of FIG. 1 including the flexible membrane deployment system in a collapsed profile;

FIG. 4A is a schematic perspective view of the vehicle of FIG. 1 including the flexible membrane deployment system in a vehicle-unloading configuration;

FIG. 4B is a schematic perspective view of the rear portion of the vehicle of FIG. 1 including the flexible membrane deployment system in the vehicle-unloading configuration and a rear door of the vehicle open;

FIG. 5 is a schematic elevation view of a hinge pin for use in mounting the flexible membrane deployment system of FIG. 1 on the vehicle of FIG. 1;

FIG. 6 is a schematic elevation view of a side panel mounting bar for use in mounting the flexible membrane deployment system of FIG. 1 on the vehicle of FIG. 1;

FIG. 7 is a schematic elevation view of an alternative side panel mounting bar for use in mounting the flexible membrane deployment system of FIG. 1 on the vehicle of FIG. 1;

FIG. 20 is a schematic plan view of an example flexible membrane, including a plurality of sections, that may be used with the flexible membrane deployment system of FIG. 1; and FIG. 21 is a graph depicting an amount of deformation of each of the plurality of sections in FIG. 20 with respect to an amount of applied force.

FIG. 28 is a schematic sectional elevation view of a flexible membrane of the alternative flexible membrane deployment system of FIG. 27 in a deployed profile.

DETAILED DESCRIPTION

The embodiments described herein include an actively inflatable flexible membrane coupled to a rear end of a trailer. In some embodiments, the flexible membrane is actively selectively inflatable to different aerodynamic profiles, and each profile reduces aerodynamic drag induced by the trailer at a given operating condition of the trailer. In some embodiments, the flexible membrane is mounted to a rear mounting panel that can serve as the rear cargo door of the trailer, for example by replacing the traditional rear doors of the trailer in a retrofit. Alternatively, the rear mounting panel can be added over the existing rear cargo doors of the trailer in a swing-away configuration that accommodates traditional trailer loading and unloading capabilities. Inflation pressure is provided by a dedicated compressor coupled to the trailer. In certain embodiments, a manifold on the rear mounting panel routes compressed air between the compressor and the interior space defined by the flexible membrane. The flexible membrane may be formed from materials having different deformation responses to a given force, in a pattern selected to achieve a desired profile at a given inflation pressure and trailer operating condition. In some embodiments, an additional vacuum pump is provided to actively deflate the flexible membrane to facilitate transitioning of the flexible membrane between different aerodynamic profiles. A telescoping actuator may be provided to assist in maintaining a stability of a profile of the flexible membrane. In some embodiments, a plurality of flexible membranes are actively inflated/deflated in concert to achieve a selected composite aerodynamic profile.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
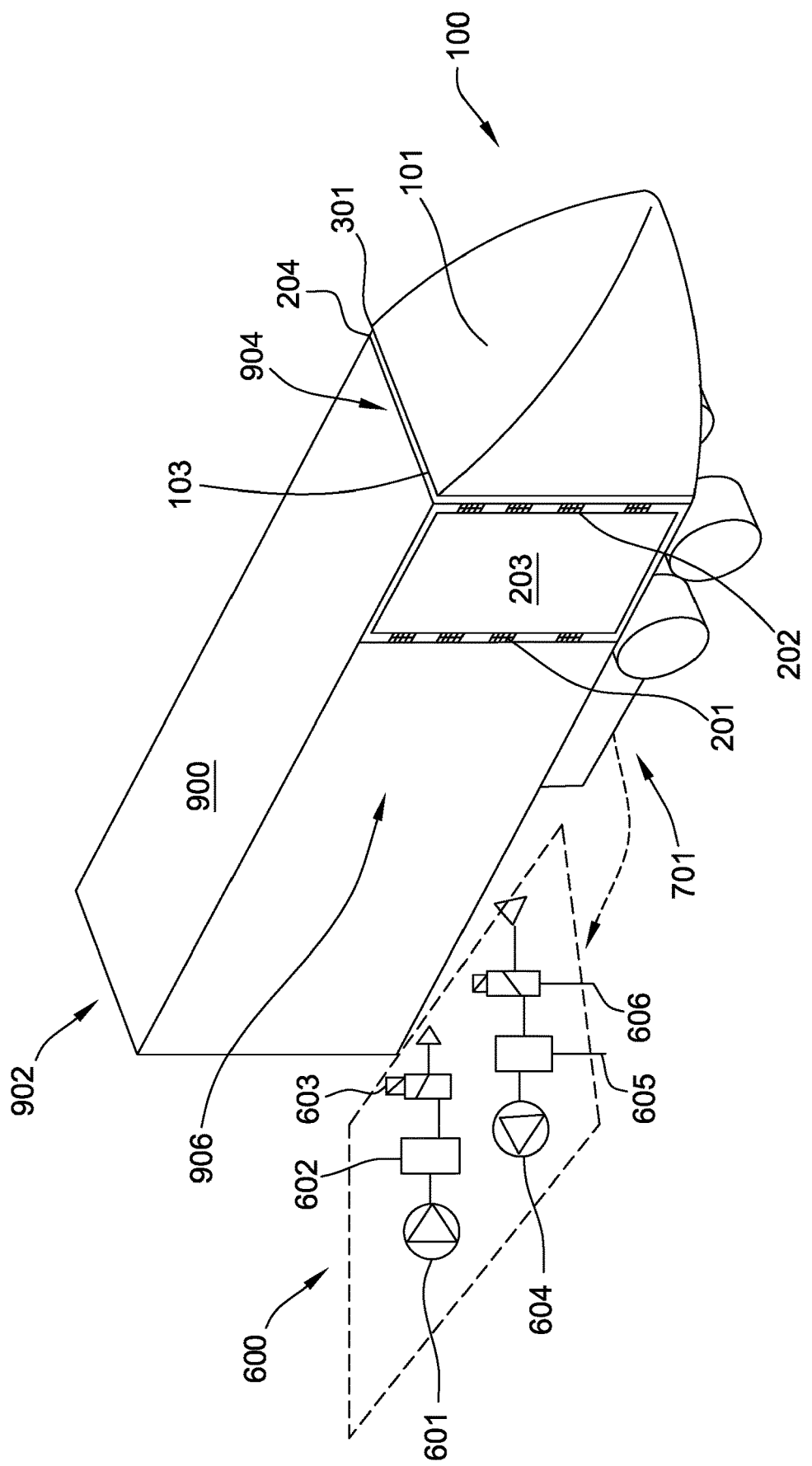
FIG. 1 is a schematic perspective view of a vehicle including a flexible membrane deployment system in a deployed profile.

FIG. 1 is a schematic perspective view of a vehicle 900 including a flexible membrane deployment system 100 in a deployed profile. FIG. 2 is a schematic elevation view of a plurality of deployed profiles of the flexible membrane deployment system 100. System 100 includes a flexible membrane 101 coupled to a rear end 904 of vehicle 900. In the example embodiment, vehicle 900 is a tractor-trailer unit including a standard-sized cargo semi-trailer having a front end 902 configured for connection to the tractor unit (not shown). Alternatively, vehicle 900 is any vehicle having a blunt-shaped rear surface profile that tends to create aerodynamic drag forces on the vehicle (for example, a bus).

Flexible membrane 101 may be made of any suitable deformable material that is substantially impervious to air flow therethrough. Non-limiting examples of suitable deformable materials include automobile air bag material, coated mine shaft air tunnel materials, parachute material, parasail material, hydraulic accumulator bag material, and any balloon-type materials. One example is an elastomer-based material.

A perimeter 103 of flexible membrane 101 is sealingly coupled to rear end 904 of vehicle 900, such that a variable-volume cavity 128 is defined between flexible membrane 101 and rear end 904. Flexible membrane deployment system 100 includes a source 601 of pressurized gas 129 coupled to trailer 900 and in fluidic communication with variable-volume cavity 128. In the example embodiment, source 601 is an electrically driven air compressor. It should be noted that electrical service, including capacity to drive source 601, is readily available on standard tractor trailers and other commercial vehicles. Alternatively, source 601 is implemented in any suitable fashion that enables flexible membrane deployment system 100 to function as described herein.

Flexible membrane deployment system 100 also includes a controller 600 operable to control a flow of the pressurized gas 129 from source 601 to variable-volume cavity 128. For example, controller 600 includes a regulator 602 responsive to commands entered via a control panel (not shown) located on the vehicle 900, such as in a cab of a tractor unit. More specifically, regulator 602 is selectively operable to increase a pressure of pressurized gas 129 in variable-volume cavity 128 such that flexible membrane 101 moves from a stowed profile 101R, in which flexible membrane 101 is collapsed against rear end 904 of vehicle 900, to a first deployed profile 101Z, in which flexible membrane 101 is maintained in a first pre-selected tapered aerodynamic shape projecting rearward from rear end 904. For example, first deployed profile 101Z is selected to reduce an aerodynamic drag induced on vehicle 900 at a given first operating condition (e.g., a first forward travel speed) of vehicle 900.

In the example embodiment, controller 600 further includes a source valve 603 operable to enable or disable the flow of pressurized gas 129 to variable-volume cavity 128 from source 601. For example, source valve 603 is responsive to commands entered via a control panel (not shown) located on the vehicle 900, such as in a cab of a tractor unit. Alternatively, controller 600 includes any suitable elements that enable flexible membrane deployment system 100 to function as described herein.

In the example embodiment, source 601 and controller 600, including regulator 602 and source valve 603, are housed in an equipment compartment 701 attached to vehicle 900, such as on an underside of the semi-trailer. Alternatively, source 601 and controller 600 are housed in any suitable location that enables flexible membrane deployment system 100 to function as described herein.

It should be noted that some examples of vehicle 900 include additional sources of compressed air, such as for trailer air-brake systems. However, in the example embodiment, source 601 and controller 600 are implemented independently from such other systems that require compressed air. For example, source 601 and controller 600 are not in fluidic communication with a trailer air-brake system of the trailer 900. Thus, in the example embodiment, flexible membrane deployment system 100 may be retrofitted to vehicle 900 without altering an operation or effectiveness of such other systems.

In the example embodiment, controller 600 further includes a vacuum pump 604 in fluidic communication with the variable-volume cavity 128 and operable to actively extract the pressurized gas 129 from the variable-volume cavity 128 such that flexible membrane 101 is returned from the first deployed profile 101Z to the stowed profile 101R.

Vacuum pump 604 facilitates an increased speed of deflation of variable-volume cavity 128, such as for faster access to unloading of the trailer after arrival at a destination. Alternatively, variable-volume cavity 128 is deflated in any suitable fashion that enables flexible membrane deployment system 100 to function as described herein. For example, variable-volume cavity 128 is deflated by venting to atmosphere and manual pressure on an outer surface of flexible membrane 101.

In the example embodiment, controller 600 also includes a vacuum regulator 605 responsive to commands entered via a control panel (not shown) located on the vehicle 900, such as in a cab of a tractor unit. More specifically, vacuum regulator 605 is selectively operable to decrease a pressure of pressurized gas 129 in variable-volume cavity 128 such that flexible membrane 101 moves back toward stowed profile 101R from first deployed profile 101Z. In the example embodiment, flexible membrane deployment system 100 further includes a vacuum valve 606 operable to enable or disable a flow of the pressurized gas 129 induced by vacuum pump 604 from variable-volume cavity 128 into the atmosphere. For example, vacuum valve 606 is responsive to commands entered via a control panel (not shown) located on the vehicle 900, such as in a cab of a tractor unit. Vacuum valve 606 may be co-implemented with source valve 603, for example as a bi-directional solenoid valve. In the example embodiment, vacuum pump 604, vacuum regulator 605, and vacuum valve 606 are housed in equipment compartment 701 with other elements of controller 600. Alternatively, vacuum pump 604, vacuum regulator 605, and vacuum valve 606 are housed in any suitable location that enables flexible membrane deployment system 100 to function as described herein.

It should be understood that the overall profile or shape of flexible membrane 101 depends on the pressure of pressurized air 129 within variable-volume cavity 128 and forces on an exterior surface flexible membrane 101 at a given operating condition (due to dynamic pressure at travelling speed, weather, etc.). FIG. 20 is a schematic plan view of an example embodiment of flexible membrane 101, including a plurality of sections 800. FIG. 21 is a graph depicting an amount of deformation of each of the plurality of sections 800 with respect to an amount of applied force. In particular, in FIG. 21, a horizontal axis 801 represents deflection and a vertical axis 802 represents applied force. With reference to FIGS. 1, 2, 20, and 21, in some embodiments, flexible membrane 101 is formed from plurality of sections 800 having different deformation responses to a given air pressure in variable-volume cavity 128. For example, flexible membrane 101 includes a peripheral section 803, an intermediate section 805, and a central section 807 each having a different force/deflection curve, as illustrated in FIG. 21. The use of sections 800 having different deflection responses enables the profile of flexible membrane 101 to be tailored into a specific shape for a given operating condition. In other words, sections 800 enable flexible membrane 101 to have a multi-faceted profile 810, corresponding to profile 101Z illustrated in FIG. 2, at a given setting of regulator 602.

In some embodiments, flexible membrane 101 is a unitary flexible membrane 101 having sections 800 formed from a plurality of different resiliently deformable materials. In other words, the respective materials used to form each of sections 800 have different physical properties (e.g., different moduli of elasticity) that result in a different deformation response to a given loading. For example, flexible membrane 101 has a substantially constant thickness across sections 800, and the different materials used to form sections 803, 805, and 807 each deform differently, in response to a given pressure of the pressurized gas 129 in the variable-volume cavity 128, to define the preselected tapered aerodynamic shape of profile 810. In other embodiments, flexible membrane 101 is a unitary flexible membrane 101 formed from a single resiliently deformable material across sections 800, but having different membrane thicknesses in each of sections 800. For example, the different membrane thickness of the single material used to form sections 803, 805, and 807 cause each section to deform differently, in response to a given pressure of the pressurized gas 129 in the variable-volume cavity 128, to define the preselected tapered aerodynamic shape of profile 810. In further embodiments, flexible membrane 101 includes sections 800 defined by a combination of different materials and different membrane thicknesses that cause each section to deform differently, in response to a given pressure of the pressurized gas 129 in the variable-volume cavity 128, to define the preselected tapered aerodynamic shape of profile 810.

Alternatively, flexible membrane 101 does not include sections 800 having different deformation responses.

In the example embodiment, flexible membrane 101 also includes pre-formed crease or fold lines 811 extending therein. In this context, the term "pre-formed" means, e.g., formed prior to installation of flexible membrane deployment system 100 on vehicle 900. For example, fold lines 811 extend across the plurality of sections 800 and cooperate with sections 800 to further define multi-faceted profile 810. Fold lines 811 may be pre-formed in flexible membrane 101 in any suitable fashion that enables flexible membrane deployment system 100 to function as described herein. Alternatively, flexible membrane 101 does not include fold lines 811.

Although flexible membrane 101 in an unforced state is illustrated as substantially flat in FIG. 20, with perimeter 103 defined by a substantially rectangular boundary, it should be understood that flexible membrane 101 and/or perimeter 103 may have any suitable shape in the unforced state that enables flexible membrane deployment system 100 to function as described herein. When flexible membrane 101 is coupled to rear end 904 of vehicle 900, perimeter 103 defines an opening in flexible membrane 101 through which variable-volume cavity 128 may be inflated or deflated.

Returning to FIGS. 1 and 2, in the example embodiment, controller 600 is further operable to control the flow of pressurized gas 129 from source 601 to variable-volume cavity 128 such that flexible membrane 101 is movable between the first deployed profile 101Z and a second deployed profile 101A, wherein flexible membrane 101 is maintained in a second pre-selected tapered aerodynamic shape projecting rearward from the rear end 904. More specifically, the second pre-selected tapered aerodynamic shape is different from the first pre-selected tapered aerodynamic shape. For example, second deployed profile 101A is selected to reduce an aerodynamic drag induced on vehicle 900 at a given second operating condition (e.g., a second forward travel speed) of vehicle 900. In some examples, the different forward travel speeds may correspond to 55 miles per hour and 75 miles per hour.

Moreover, in some embodiments, controller 600 is further operable to control the flow of pressurized gas 129 from source 601 to variable-volume cavity 128 such that flexible membrane 101 is movable to other deployed profiles in addition to the first deployed profile 101Z and the second deployed profile 101A. For example, regulator 602 is operable to fine-tune the flow of pressurized gas 129 at a given forward travel speed to further reduce aerodynamic drag or otherwise improve drivability of vehicle 900 based on environmental conditions (e.g., weather). In certain embodiments, controller 600 is responsive to commands entered via a control panel (not shown) located on the vehicle 900, such as in a cab of a tractor unit, to adjust first deployed profile 101Z to third deployed profile 101Y, and/or to adjust second deployed profile 101A to fourth deployed profile 101X, in response to ambient wind or atmospheric pressure conditions on vehicle 900.

In the example embodiment, flexible membrane deployment system 100 further includes a rear mounting panel 204 coupled to rear end 904 of vehicle 900. More specifically, perimeter 103 of flexible membrane 101 is coupled to rear end 904 of vehicle 900 via coupling to rear mounting panel 204. Alternatively, perimeter 103 of flexible membrane 101 is coupled to rear end 904 in any suitable fashion that enables flexible membrane deployment system 100 to function as described herein.

In the example embodiment, rear mounting panel 204 is fabricated from a lightweight, yet rigid and impact-resistant material. For example, rear mounting panel 204 is fabricated from plastic or machined aluminum. Alternatively, rear mounting panel 204 is fabricated from any suitable material that enables flexible membrane deployment system 100 to function as described herein.

Figure 8:
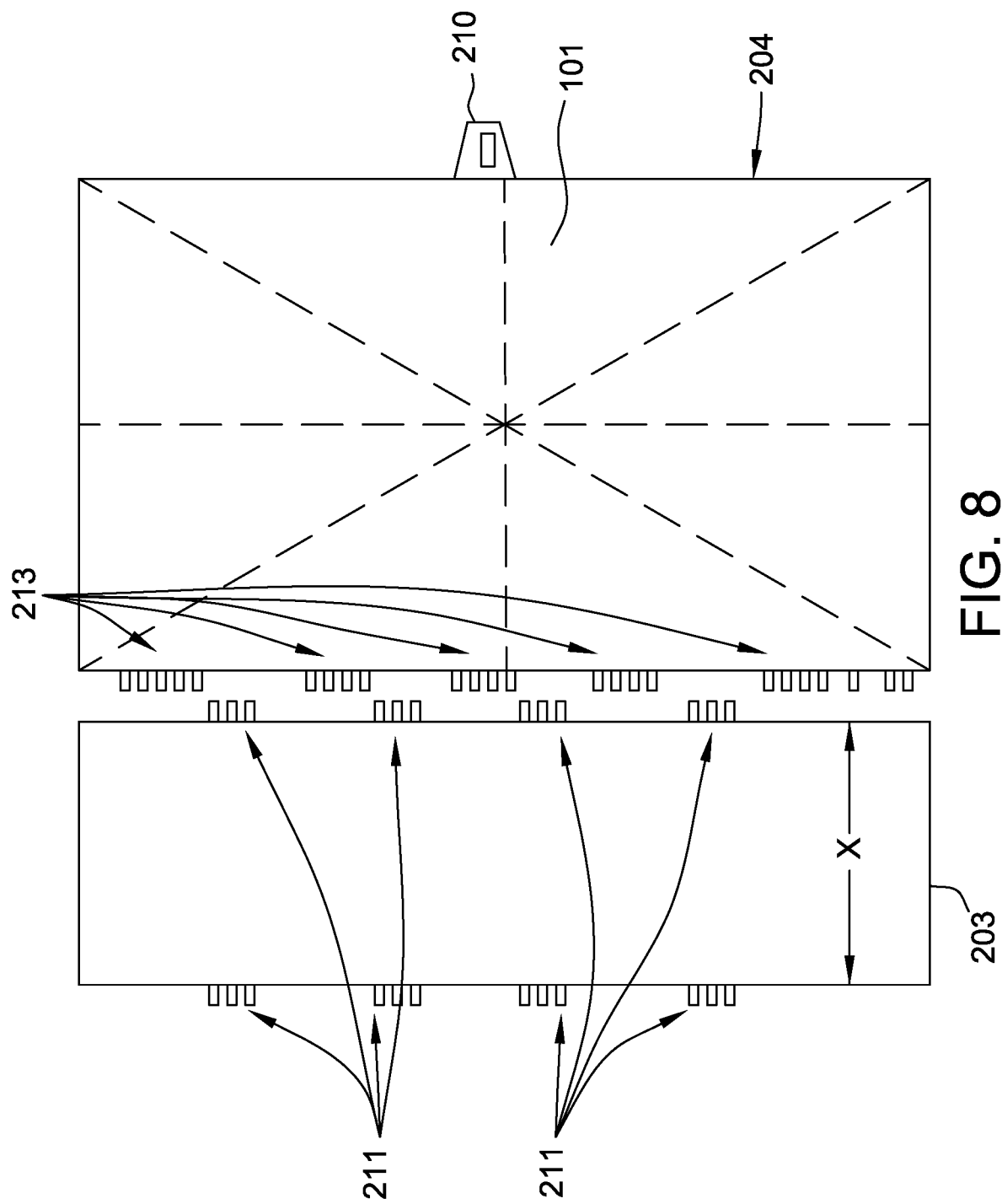
FIG. 8 is a schematic elevation view of a side mounting panel and a rear mounting panel of the flexible membrane deployment system of FIG. 1.

In some embodiments, rear mounting panel 204 is added over existing rear cargo doors 901 of vehicle 900 in a swing-away configuration that accommodates conventional trailer loading and unloading capabilities. FIG. 3 is a schematic bottom view of a rear portion of vehicle 900 including flexible membrane deployment system 100 in a collapsed profile. FIG. 4A is a schematic perspective view of vehicle 900 including flexible membrane deployment system 100 in a vehicle-unloading configuration. FIG. 4B is a schematic perspective view of the rear portion of vehicle 900 including flexible membrane deployment system 100 in the vehicle-unloading configuration and one of rear cargo doors 901 of the vehicle open to enable access to an interior of vehicle 900 (e.g., a cargo area of a semi-trailer) via a rear cargo opening 903. FIG. 8 is a schematic elevation view of a side mounting panel 203 and rear mounting panel 204.

With reference to FIGS. 1, 3, 4A, 4B, and 8, in some embodiments, flexible membrane deployment system 100 includes swing panel 203 mountable on an exterior of a side wall 906 of vehicle 900. Swing panel 203 enables rear mounting panel 204 to be moved between a first position parallel and adjacent to rear end 904 (shown in FIG. 3), and a second position parallel and adjacent to the exterior of side wall 906 (shown in FIG. 4A).

In the example embodiment, swing panel 203 includes a pair of hinge joints 211 on opposing side edges thereof. A first of the pair of hinge joints 211 is rotatably mounted to side wall 906 of vehicle 900. For example, FIG. 6 is a schematic elevation view of a side panel mounting bar 201 for use in mounting the first hinge joint 211 of swing panel 203 adjacent to side wall 906 of vehicle 900. Side panel mounting bar 201 is configured to be fixedly mounted along the exterior of side wall 906 and includes a plurality of mounts 217, in the form of pegs, arranged vertically therealong. More specifically, mounts 217 are spaced and oriented to register with elements of first hinge joint 211 of swing panel 203, such that when swing panel 203 is lowered downward, the elements of the first hinge joint 211 receive respective pegs to rotatably couple swing panel 203 to side panel mounting bar 201. For another example, FIG. 7 is a schematic elevation view of an alternative side panel mounting bar 201 for use in mounting the first hinge joint 211 of swing panel 203 adjacent to side wall 906 of vehicle 900. The alternative side panel mounting bar 201 includes plurality of mounts 217 in the form of pillow blocks, arranged vertically therealong, spaced and oriented to register with elements of first hinge joint 211 of swing panel 203, such that the elements of the first hinge joint 211 are coupleable to respective pillow blocks to rotatably couple swing panel 203 to side panel mounting bar 201. Alternatively, the first hinge joint 211 of swing panel 203 is rotatably mountable to the exterior of side wall 906 in any suitable fashion that enables flexible membrane deployment system 100 to function as described herein.

In the example embodiment, the opposite second pair of hinge joints 211 of swing panel 203 is rotatably mounted to rear mounting panel 204. For example, rear mounting panel 204 includes a hinge joint 213 configured to cooperate with the second hinge joint 211 of swing panel 203, and a hinge pin 202, shown in FIG. 5, is inserted through the cooperating hinge joints 211 and 213 to rotatably couple rear mounting panel 204 to swing panel 203. Alternatively, rear mounting panel 204 is rotatably coupled to swing panel 203 in any suitable fashion that enables flexible membrane deployment system 100 to function as described herein.

In the example embodiment, rear mounting panel 204 further includes a fastener 210 on a side edge opposite hinge joint 213. Fastener 210 is operable to selectively engage rear end 904 to secure rear mounting panel 204 in the first position during transit of vehicle 900. For example, fastener 210 is a hinged door fastener configured to mate with an eye bolt mounted on rear end 904 to provide a locking mechanism for rear mounting panel 204 in the first position. In some embodiments, fastener 210 is further operable to selectively engage side wall 906 to secure rear mounting panel 204 in the second position during loading/unloading of vehicle 900. Alternatively, rear mounting panel 204 is securable in the first position and/or the second position in any suitable fashion that enables flexible membrane deployment system 100 to function as described herein.

In the example embodiment, swing panel 203 is sized such that, in the second position, swing panel 203 and rear mounting panel 204 are offset from rear end 904 by a sufficient distance to enable rear cargo door 901 of vehicle 900 to be rotated open and flush directly against the exterior of side wall 906, as shown in FIG. 4B, to enable conventional trailer unloading operations. For example, a width x of swing panel 203 (shown in FIG. 8) is approximately two inches wider than a width y (shown in FIG. 4B) of rear cargo door 901, enabling flexible membrane deployment system 100 to be completely cleared from a working area of rear cargo doors 901/rear cargo opening 903 during loading/unloading of vehicle 900. In some embodiments, rear cargo doors 901 are standard-sized semi-trailer rear cargo doors.

Figure 9:
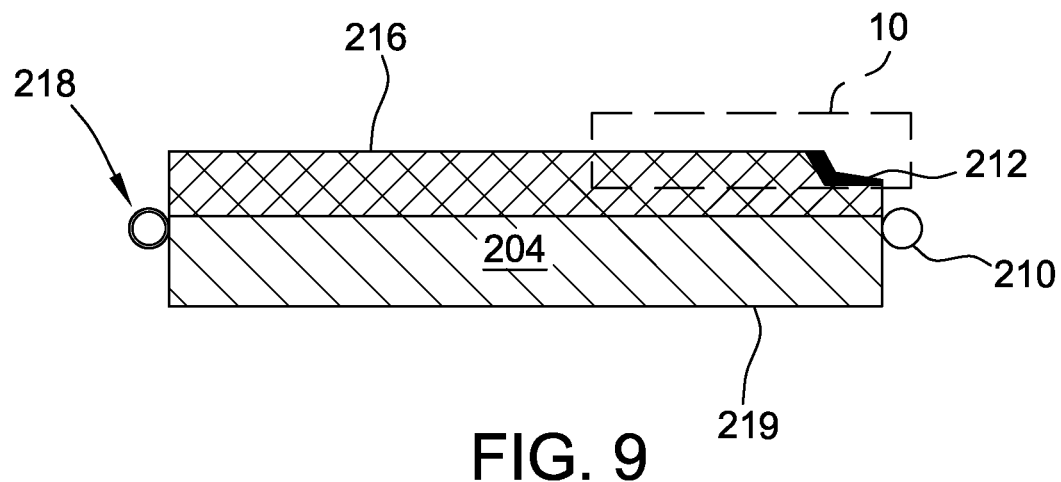
FIG. 9 is a schematic top view of an alternative rear mounting panel that may be used to replace standard rear cargo doors of the vehicle of FIG. 1.
Figure 10:
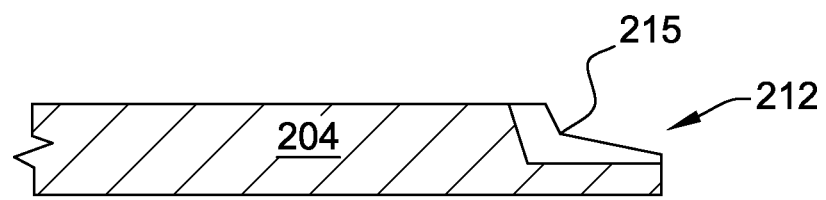
FIG. 10 is a detail view of the rear mounting panel of FIG. 9.

In some embodiments, rather than installing flexible membrane deployment system 100 over rear cargo doors 901, rear mounting panel 204 may be used to replace rear cargo doors 901 as a one-piece rear cargo door used to directly seal rear cargo opening 903 during transit of vehicle 900. FIG. 9 is a schematic top view of an alternative rear mounting panel 204 that may be used to seal rear cargo opening 903 when rear mounting panel 204 is in the first position. FIG. 10 is a detail view of rear mounting panel 204 shown in FIG. 9. The alternative rear mounting panel 204 is substantially similar to rear mounting panel 204 as described above, including fastener 210 operable to selectively engage rear end 904 to secure rear mounting panel 204 in the first position during transit of vehicle 900. However, rather than hinge joint 213 configured to rotatably mount to swing panel 203, rear mounting panel 204 includes hinge joint 218 configured to rotatably mount directly to rear end 904 in place of the left-hand (or alternatively, the right-hand) standard rear cargo door 901. Alternatively, rear mounting panel 204 is configured for installation on rear end 904 in any suitable fashion that enables flexible membrane deployment system 100 to function as described herein.

In the example embodiment, rear mounting panel 204 configured to replace rear cargo doors 901 includes an interior-facing panel 216 and an exterior-facing panel 219 coupled together in face-to-face-relationship. More specifically, interior-facing panel 216 is configured to be received within rear cargo opening 903 when rear mounting panel 204 is closed, and exterior-facing panel 219 is configured to extend rearward from rear cargo opening 903 when rear mounting panel 204 is closed. Flexible membrane 101 is coupled to exterior-facing panel 219. Exterior-facing panel 219 extending rearward from rear cargo opening 903 facilitates reducing a risk of interference between flexible membrane 101 and rear end 904 when flexible membrane 101 is deployed and retracted. Alternatively, rear mounting panel 204 is configured to couple over and seal rear cargo opening 903 in any suitable fashion that enables flexible membrane deployment system 100 to function as described herein.

In the example embodiment, interior-facing panel 216 includes a bevel 212 shaped complementary to an indent of rear end 904 along a perimeter of rear cargo opening 903. More specifically, bevel 212 enables interior-facing panel 216 to achieve a better seal against rear end 904 when rear mounting panel 204 is closed over rear cargo opening 903. In some embodiments, a compressible material 215 is coupled to interior-facing panel 216 along bevel 212. Compressible material 215 facilitates adjusting a fit between interior-facing panel 216 and rear cargo opening 903. Alternatively, interior-facing panel 216 does not include bevel 212 and/or compressible material 215.

Figure 11:
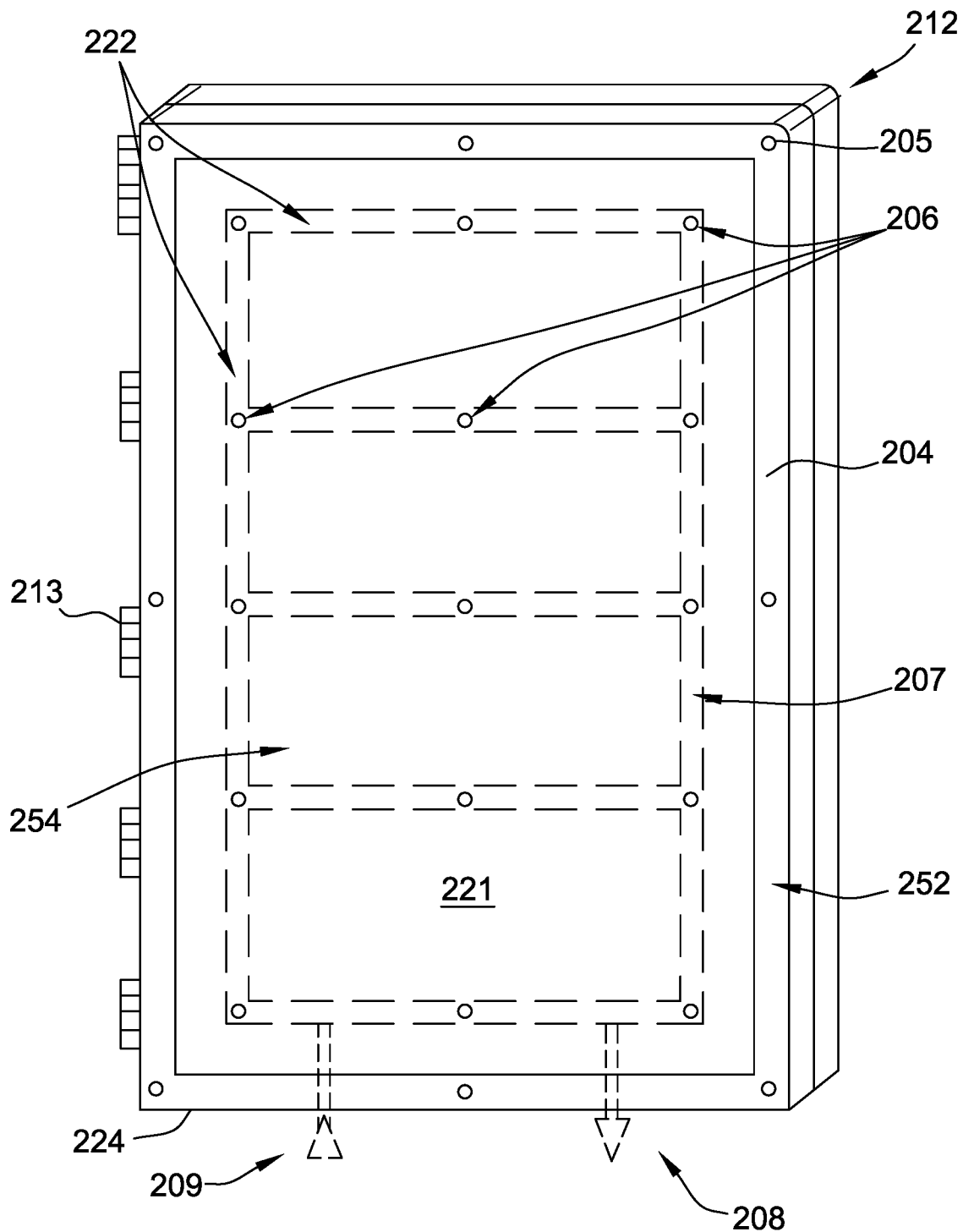
FIG. 11 is a schematic perspective view of the rear mounting panel of FIG. 8 or FIG. 9 including an example integral manifold.

FIG. 11 is a schematic perspective view of rear mounting panel 204 of FIG. 8 or FIG. 9 including an example integral manifold 207. With reference to FIGS. 1, 2, and 11, in the example embodiment, an exterior-facing surface 221 of rear mounting panel 204 includes a panel perimeter region 252 and a panel interior region 254 surrounded by panel perimeter region 252. Panel perimeter region 252 is configured for coupling to perimeter 103 of flexible membrane 101, and panel interior region 254 is configured to cooperate with flexible membrane 101 to define variable-volume cavity 128.

In the example embodiment, manifold 207 is integral to rear mounting panel 204 in the sense that rear mounting panel 204 includes one or more air channels 222 defined internally within rear mounting panel 204. Air channels 222 are in fluidic communication with an inlet port 209 defined on rear mounting panel 204. In turn, inlet port 209 is configured for coupling in fluidic communication with source 601. For example, inlet port 209 is defined in a bottom edge 224 of rear mounting panel 204, and compartment 701 includes an air line (not shown) in series with source valve 603 that extends to rear end 904 for coupling (e.g., via a quick-disconnect connector) to inlet port 209 when rear mounting panel 204 is in the first position. Alternatively, inlet port 209 is defined at any suitable location on rear mounting panel 204, and/or inlet port 209 is configured for coupling in fluidic communication with source 601 in any suitable fashion, that enables flexible membrane deployment system 100 to function as described herein.

In the example embodiment, the one or more air channels 222 are further in fluidic communication with at least one cavity port 206. In turn, cavity ports 206 extend through exterior-facing surface 221, within panel interior region 254, into fluidic communication with variable-volume cavity 128. Thus, manifold 207 defines a flow path for compressed air 129 from source 601, through inlet port 209, the one or more air channels 222, and the at least one cavity port 206, into variable-volume cavity 128. Alternatively, manifold 207 defines a flow path for compressed air 129 from source 601, through rear mounting panel 204, and into variable-volume cavity 128 in any suitable fashion that enables flexible membrane deployment system 100 to function as described herein.

In some embodiments, the use of manifold 207 integral to rear mounting panel 204 simplifies an installation of flexible membrane deployment system 100 on vehicle 900. More specifically, the installation of rear mounting panel 204, whether using swing panel 203 or in replacement of rear cargo doors 901, simultaneously provides both a support structure for flexible membrane 101 and a pre-defined air flow path between source 601 of compressed air 129 and variable-volume cavity 128. Alternatively, manifold 207 is other than integral to rear mounting panel 204. For example, manifold 207 is provided as a flexible conduit between source 601 and variable-volume cavity 128 that is structurally separate from rear mounting panel 204.

In the example embodiment, air channels 222 are further in fluidic communication with an outlet port 208 defined on rear mounting panel 204. In turn, outlet port 208 is configured for coupling in selective fluidic communication with vacuum pump 604. For example, outlet port 208 is defined in bottom edge 224 of rear mounting panel 204, and compartment 701 includes an air line (not shown) in series with vacuum valve 606 that extends to rear end 904 for coupling (e.g., via a quick-disconnect connector) to outlet port 208 when rear mounting panel 204 is in the first position. Alternatively, outlet port 208 is defined at any suitable location on rear mounting panel 204, and/or outlet port 208 is configured for coupling in fluidic communication with vacuum pump 604 in any suitable fashion, that enables flexible membrane deployment system 100 to function as described herein. In some embodiments, the use of a same manifold 207 for fluidic communication of variable-volume cavity 128 with both source 601 and vacuum pump 604 reduces a size and/or simplifies an installation of flexible membrane deployment system 100. Alternatively, vacuum pump 604 is coupled in selective fluidic communication with variable-volume cavity 128 in any suitable fashion that enables flexible membrane deployment system 100 to function as described herein, or flexible membrane deployment system 100 does not include vacuum pump 604. For example, outlet port 208 is vented to atmosphere.

Figure 12:
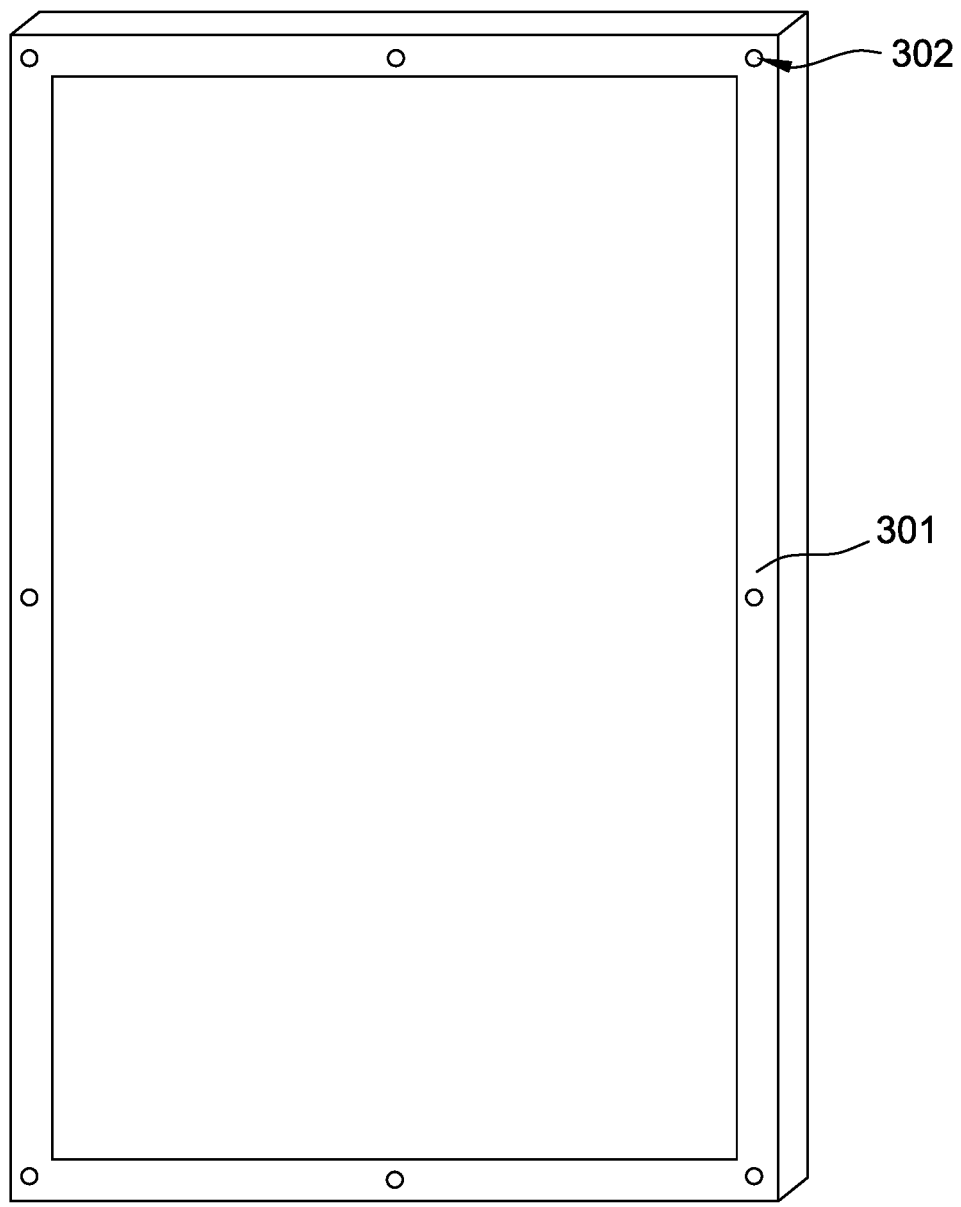
FIG. 12 is a schematic perspective view of a membrane mounting frame for use with the rear mounting panel of FIG. 8 or FIG. 9.

FIG. 12 is a schematic perspective view of a membrane mounting frame 301 for use with rear mounting panel 204 shown in FIG. 8 or FIG. 9. In the example embodiment, flexible membrane deployment system 100 further includes membrane mounting frame 301 configured to secure flexible membrane 101 to rear mounting panel 204.

With reference to FIGS. 1, 11, and 12, in the example embodiment, membrane mounting frame 301 includes a plurality of openings 302 arranged to register with a corresponding plurality of mounting openings 205 defined in panel perimeter region 252 of rear mounting panel 204. After perimeter 103 of flexible membrane 101 is sandwiched between membrane mounting frame 301 and panel perimeter region 252, suitable fasteners (not shown) are inserted into registered pairs of openings 302, 205 and tightened to secure perimeter 103 to rear mounting panel 204. Perimeter 103 may include pre-defined openings configured to register with openings 302, 205, or the fastener installation process itself may form suitable registered openings in perimeter 103. In the illustrated embodiment, eight pairs of openings 302, 205 are provided. Alternatively, any suitable number of openings is provided that enables flexible membrane deployment system 100 to function as described herein.

Figure 30:
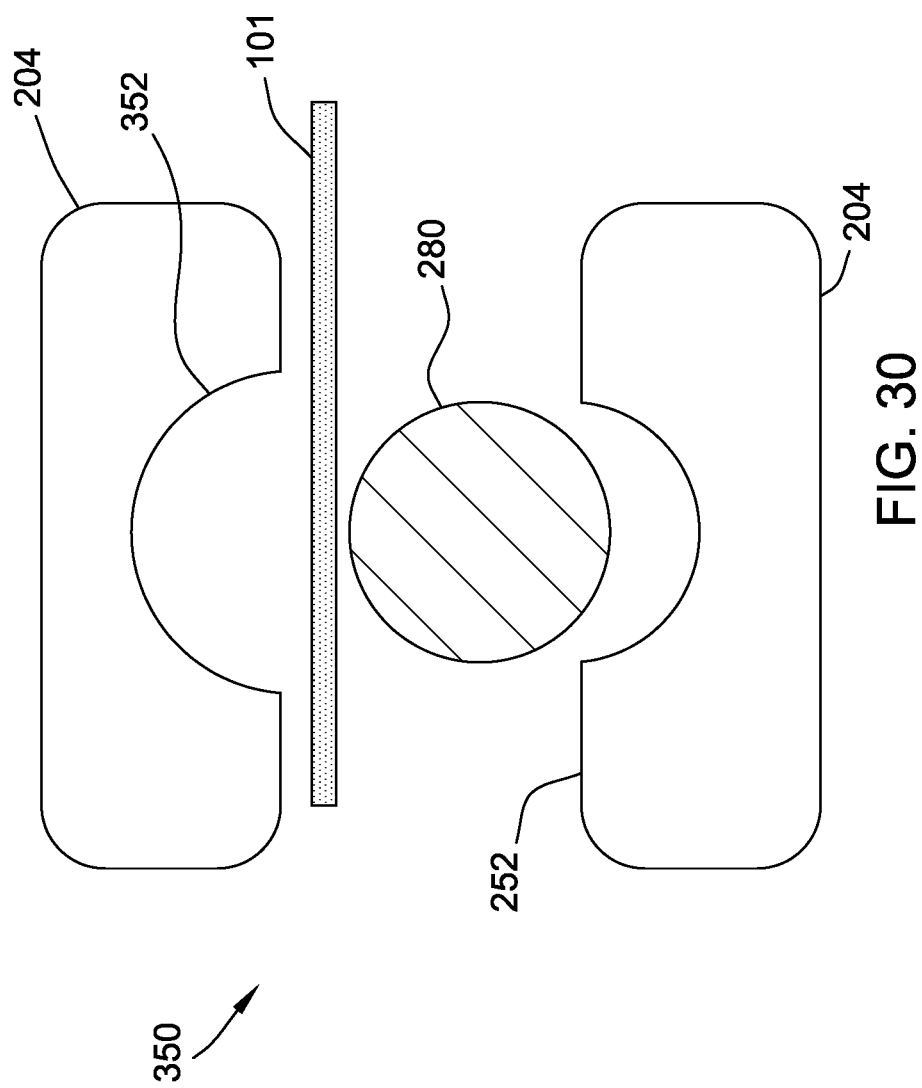
FIG. 30 is an exploded schematic view of the air-tight seal of FIG. 30.
Figure 31:
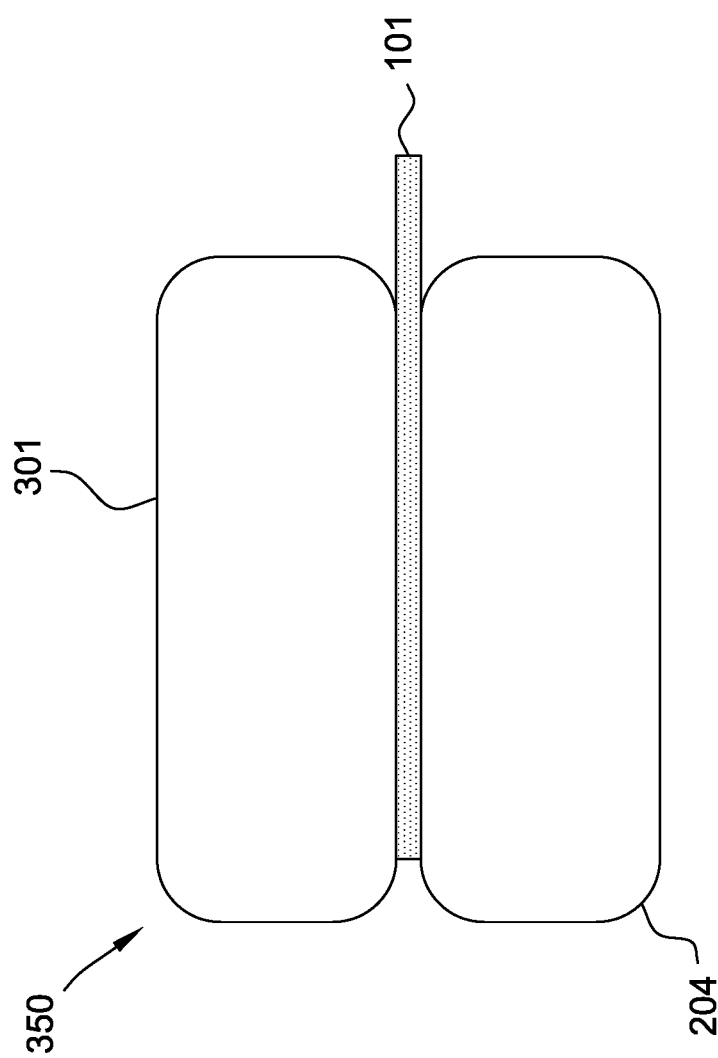
FIG. 31 is a schematic view of an alternative air-tight seal.

In the example embodiment, a portion of the flexible material used to form flexible membrane 101 is compressed directly between membrane mounting frame 301 and panel perimeter region 252, as shown in FIG. 31, and this portion functions as a compressible sealing material that facilitates an air-tight seal of variable-volume cavity 128 around perimeter 103. Additionally or alternatively, a groove (not shown) is formed in panel perimeter region 252 and/or membrane mounting frame 301, and an O-ring 280 (shown in FIGS. 29 and 30) is positioned in the groove to facilitate an air-tight seal of variable-volume cavity 128 around perimeter 103.

Alternatively, flexible membrane 101 is coupled to rear mounting panel 204 in any suitable fashion that enables flexible membrane deployment system 100 to function as described herein.

Figure 13:
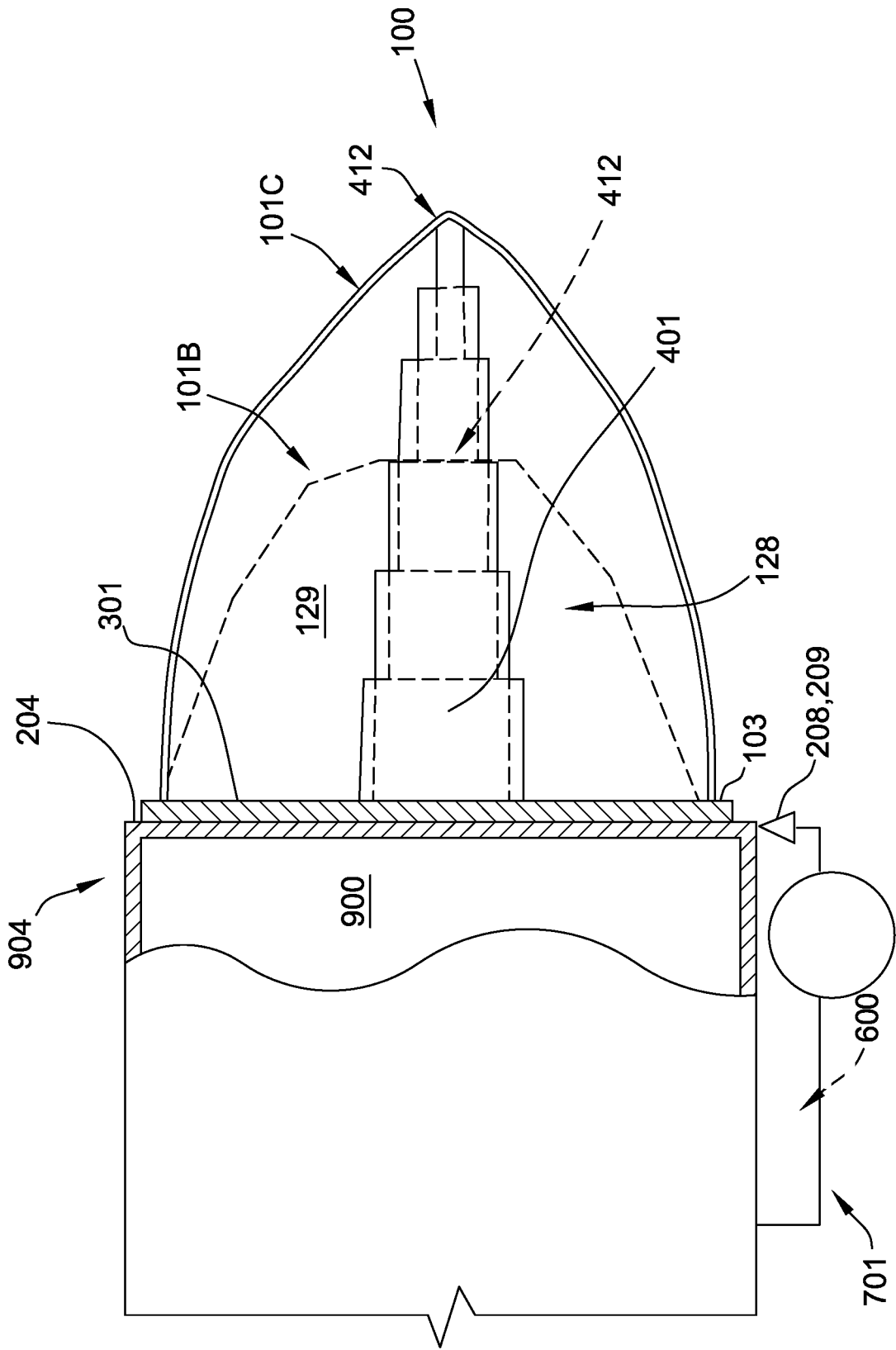
FIG. 13 is a schematic sectional elevation view of a vehicle including an alternative flexible membrane deployment system in a deployed profile.
Figure 14:
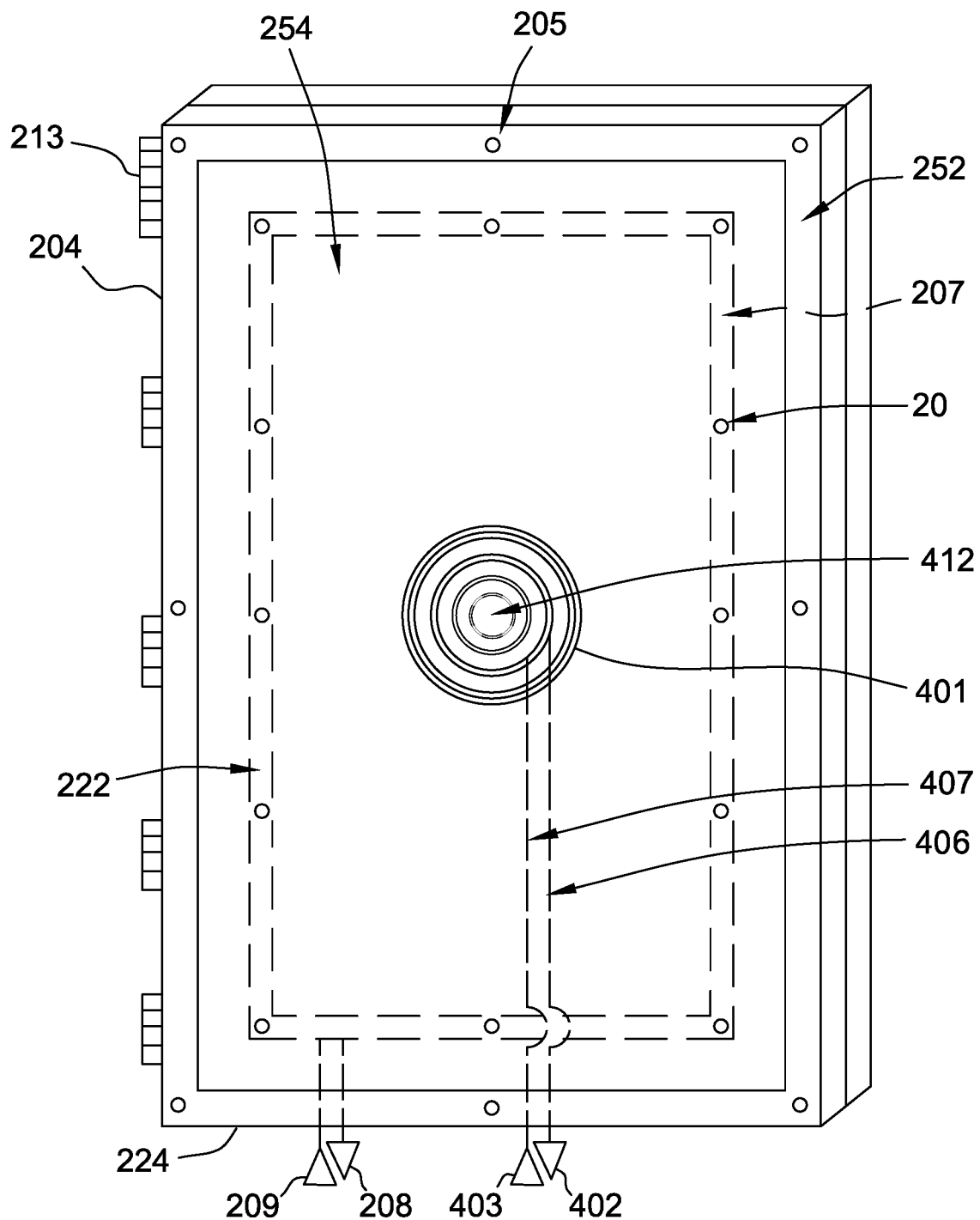
FIG. 14 is a schematic perspective view of a rear mounting panel that can be used with the flexible membrane deployment system of FIG. 13, including an example integral manifold and an example telescoping actuator.

FIG. 13 is a schematic sectional elevation view of vehicle 900 including an alternative flexible membrane deployment system 100 in a deployed profile 101C. FIG. 14 is a schematic perspective view of a rear mounting panel 204 that can be used with the alternative flexible membrane deployment system of FIG. 13. The illustrated flexible membrane deployment system 100 includes elements substantially identical to those described above, but further includes a telescoping actuator 401 coupled to rear end 904 of vehicle 900.

Telescoping actuator 401 includes a distal end 412 selectively movable, within variable-volume cavity 128, between a retracted position (shown in FIG. 14), in which distal end 412 is proximate to rear end 904, and a first extended position (shown in FIG. 13), in which distal end 412 (identified with a dashed leader line) is spaced apart from rear end 904 at a first distance. Controller 600 (shown in FIG. 1) and telescoping actuator 401 are cooperatively operable to move flexible membrane 101 from stowed profile 101R (shown in FIG. 2) to a first deployed profile 101B (showed in dashed lines). More specifically, the first extended position causes distal end 412 to extend at or near a distal tip of flexible membrane 101 in deployed profile 101B. First deployed profile 101B corresponds to a first pre-selected tapered aerodynamic shape projecting rearward from rear end 904. In some embodiments, telescoping actuator 401 in the first extended position adds rigidity to flexible membrane 101 in deployed profile 101B, for example stabilizing flexible membrane 101 against crosswinds and thereby improving drag-reducing characteristics of deployed profile 101B.

Telescoping actuator 401 in the retracted position is configured to avoid interference with flexible membrane 101 in stowed profile 101R. In other words, telescoping actuator 401 is collapsible into the retracted position to enable flexible membrane 101 to be collapsed against rear end 904 when flexible membrane deployment system 100 is not in use, for example during loading and unloading of vehicle 900. In the example embodiment, telescoping actuator 401 in the retracted position is collapsed into a disk-like configuration. Alternatively, telescoping actuator 401 in the retracted position has any suitable shape that enables flexible membrane deployment system 100 to function as described herein.

In the example embodiment, telescoping actuator 401 is further selectively movable, within variable-volume cavity 128, between the first extended position and a second extended position, in which distal end 412 (identified with a solid leader line) is spaced apart from rear end 904 at a second distance greater than the first distance. More specifically, controller 600 and telescoping actuator 401 are cooperatively operable to further move flexible membrane 101 between first deployed profile 101B and a second deployed profile 101C. Second deployed profile 101C corresponds to a second pre-selected tapered aerodynamic shape projecting rearward from rear end 904 and different from the first pre-selected tapered aerodynamic shape corresponding to first deployed profile 101B. In some embodiments, telescoping actuator 401 in the second extended position adds rigidity to flexible membrane 101 in deployed profile 101C, for example stabilizing flexible membrane 101 against cross-winds and thereby improving drag-reducing characteristics of deployed profile 101C.

In some embodiments, controller 600 is operable to maintain pressurized gas 129 in variable-volume cavity 128 at a substantially constant pressure while flexible membrane 401 is maintained in either of first deployed profile 101B and second deployed profile 101C. In other words, telescoping actuator 401 is capable of moving flexible membrane 101 between different deployed profiles, e.g., corresponding to different operating conditions of vehicle 900, without adjustment of the pressure within variable-volume cavity 128. Additionally or alternatively, in certain embodiments, controller 600 is operable to maintain pressurized gas 129 in the variable-volume cavity at a first pressure while flexible membrane 101 is maintained in first deployed profile 101B, and at a second pressure while flexible membrane 101 is maintained in second deployed profile 101C, the second pressure being different from the first pressure. In other words, telescoping actuator 401 is capable of moving flexible membrane 101 between different deployed profiles, e.g., corresponding to different operating conditions of vehicle 900, in cooperation with an adjustment of the pressure by regulator 602 within variable-volume cavity 128.

In the example embodiment, telescoping actuator 401 is mounted on rear mounting panel 204. For example, as described above, rear mounting panel 204 includes manifold 207 integral to rear mounting panel 204 and in fluidic communication with source 601 via inlet port 209, and with vacuum pump 604 via outlet port 208. Alternatively, telescoping actuator 401 is mounted to rear end 904 in any suitable fashion that enables flexible membrane deployment system 100 to function as described herein.

In the example embodiment, rear mounting panel 204 further includes an actuation system for telescoping actuator 401. For example, telescoping actuator 401 is pneumatically actuated. Accordingly, rear mounting panel 204 includes air lines 407 and 406 in fluidic communication between telescoping actuator 401 and, respectively, an actuator inlet port 403 and an actuator outlet port 402 defined on a bottom edge of rear mounting panel 204. In turn, actuator inlet port 403 and actuator outlet port 402 are in respective fluidic communication (e.g., via quick-disconnect connectors) with an actuator pneumatic source (not shown) and an actuator vacuum pump (not shown). For example, the actuator source and actuator vacuum pump, similar to source 601 and vacuum pump 604, are positioned in compartment 701 (shown in FIG. 1) and responsive to commands entered via a control panel (not shown) located on the vehicle 900, such as in a cab of a tractor unit. Pressurized air supplied through actuator inlet port 403 causes telescoping actuator 401 to extend, and vacuum pressure induced via actuator outlet port 402 causes telescoping actuator 401 to retract.

Alternatively, telescoping actuator 401 is actuatable in any suitable fashion that enables flexible membrane deployment system 100 to function as described herein.

Figure 15:
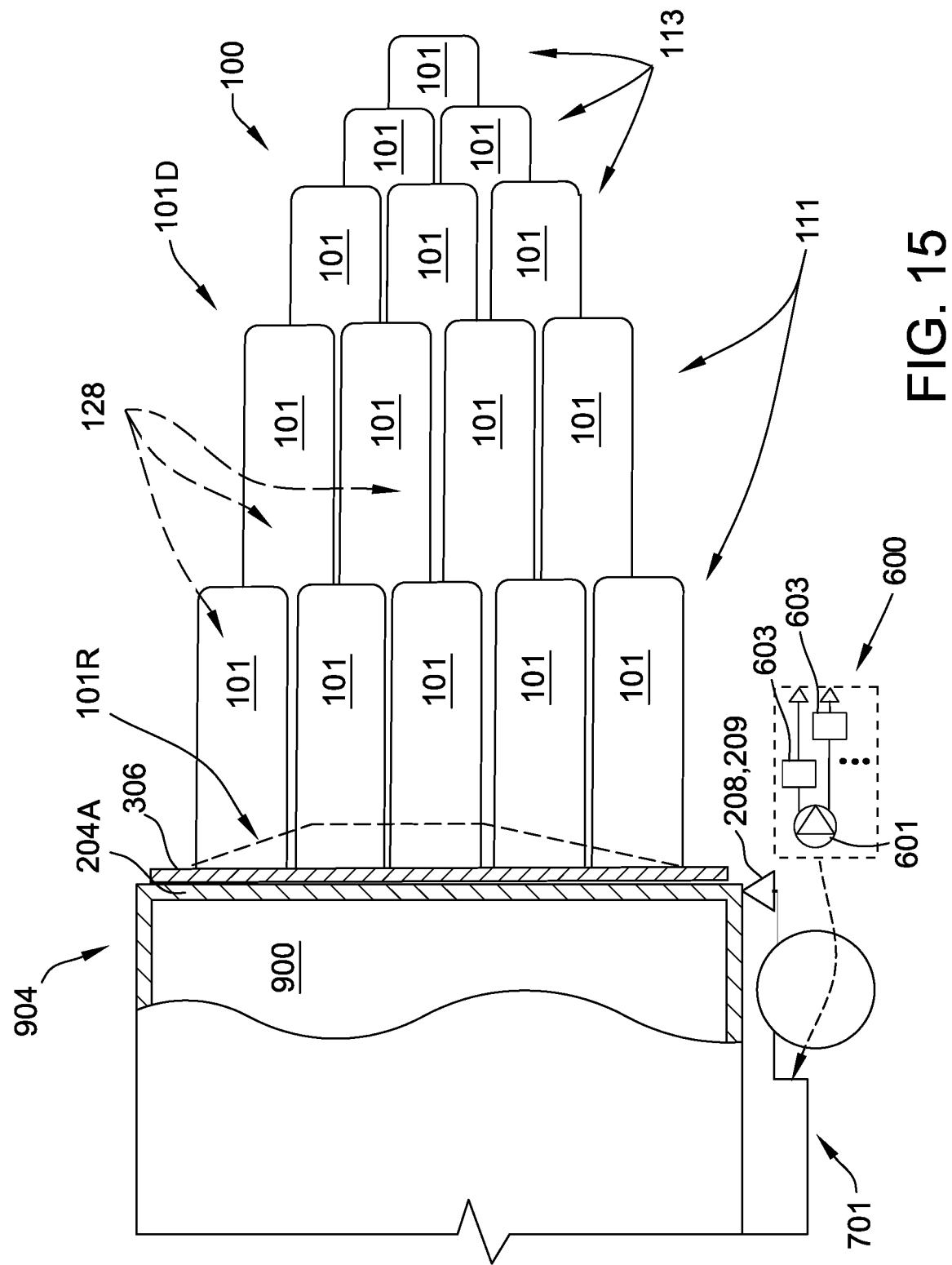
FIG. 15 is a schematic elevation view of another alternative flexible membrane deployment system in a first deployed profile.
Figure 16:
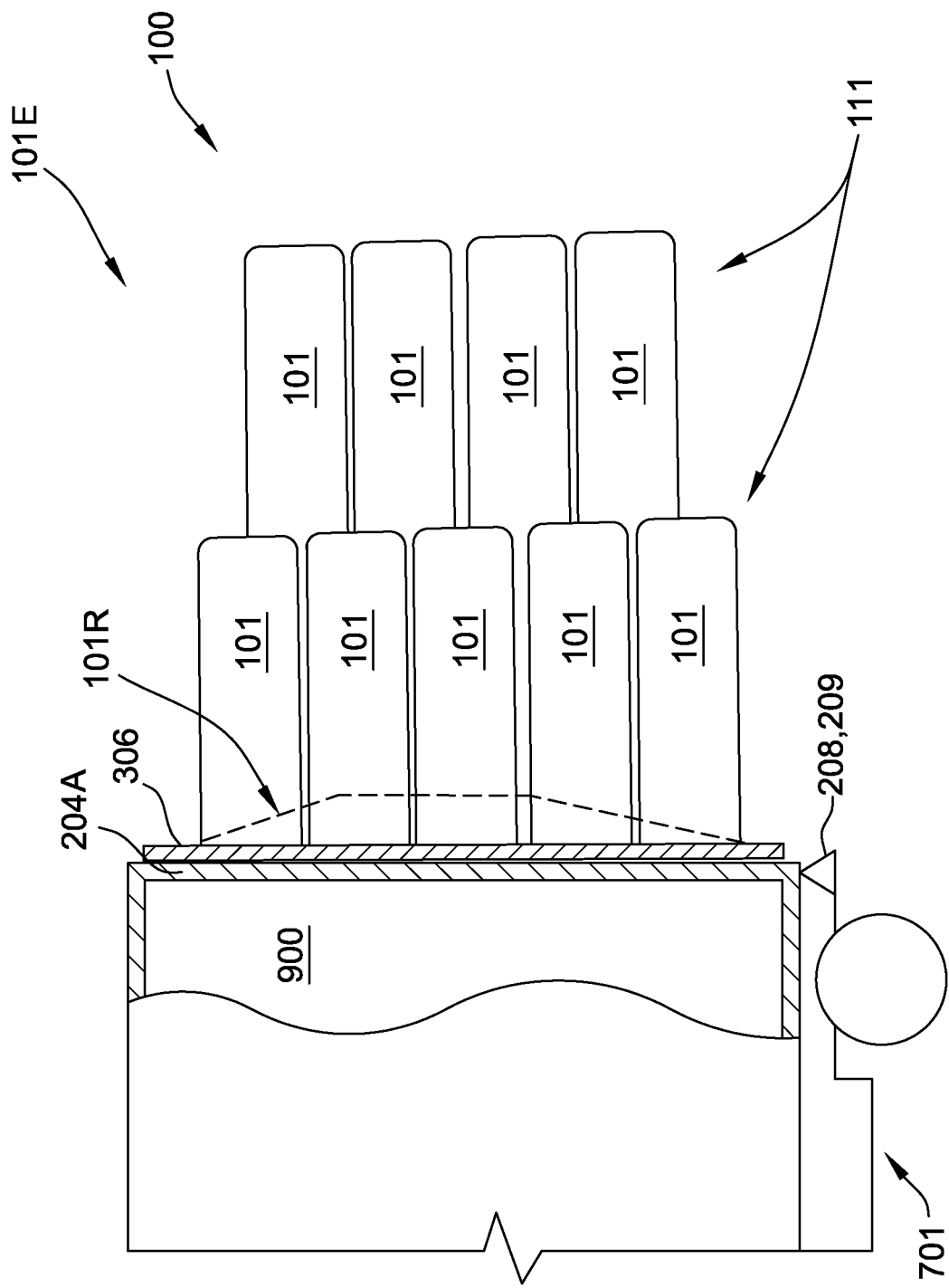
FIG. 16 is a schematic elevation view of the flexible membrane deployment system of FIG. 16 in a second deployed profile.
Figure 17:
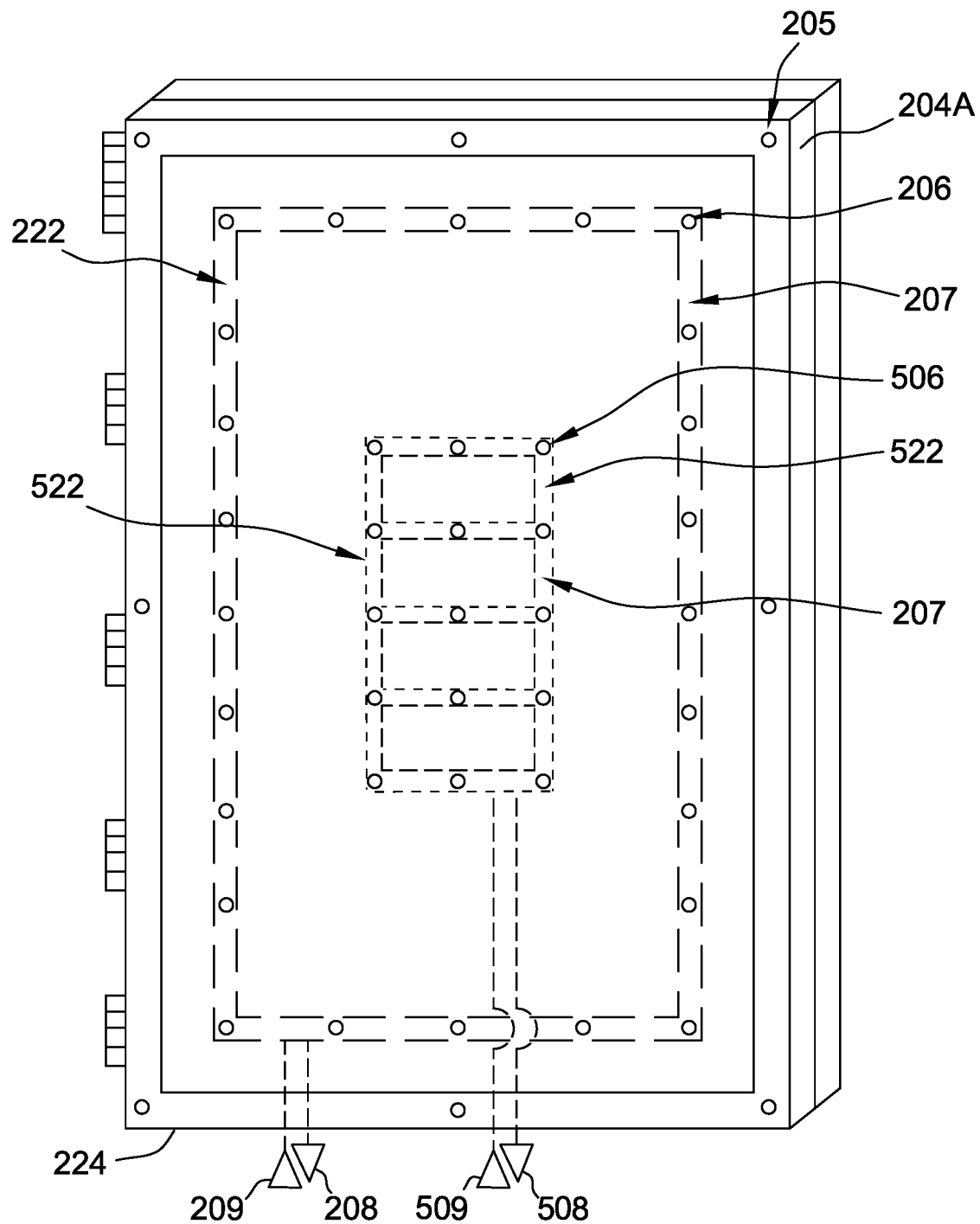
FIG. 17 is a schematic perspective view of a rear mounting panel of the flexible membrane deployment system of FIG. 16 including an example plurality of integral manifolds.
Figure 18:
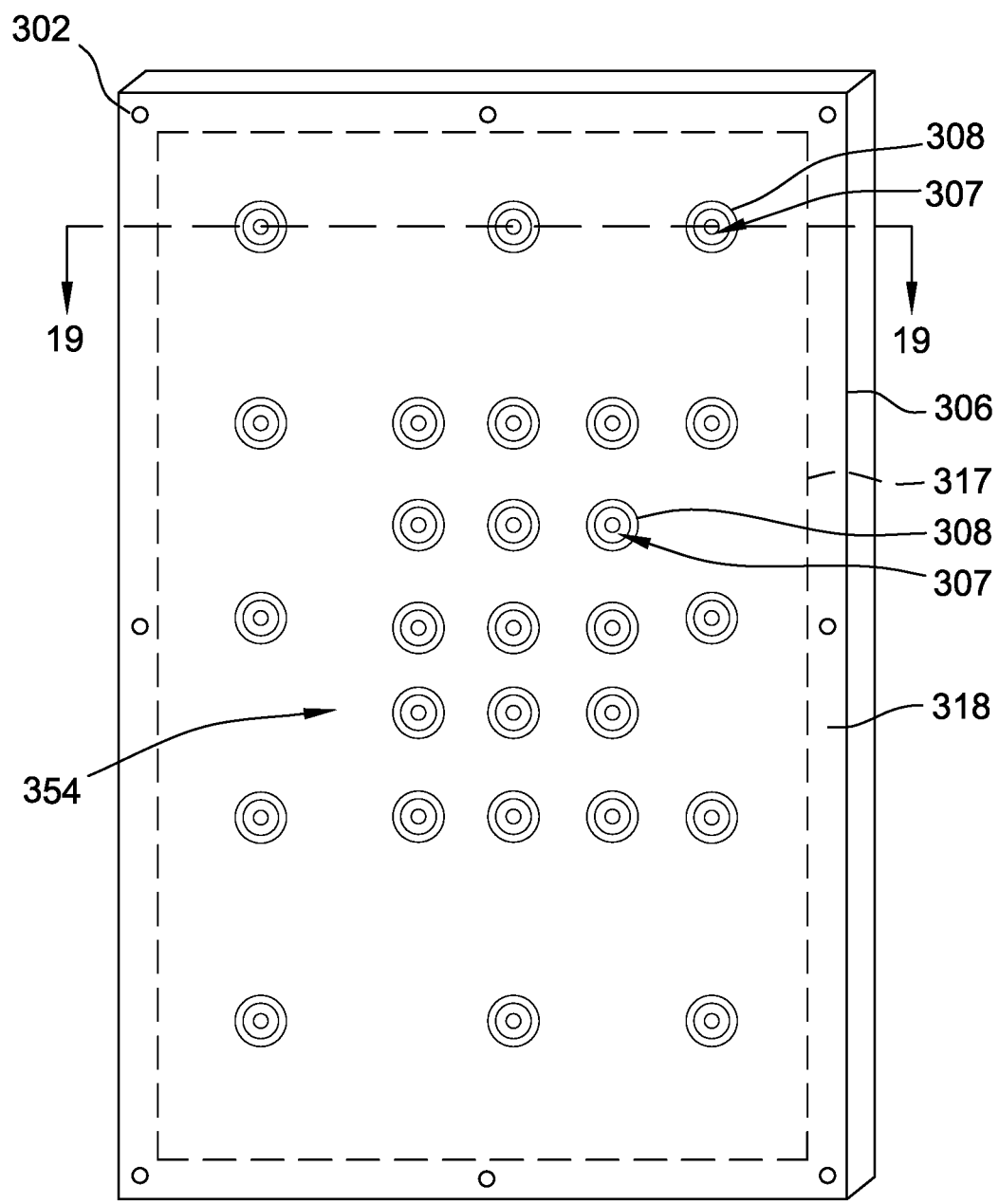
FIG. 18 is a schematic perspective view of a membrane mounting frame for use with the rear mounting panel of FIG. 17.
Figure 19:
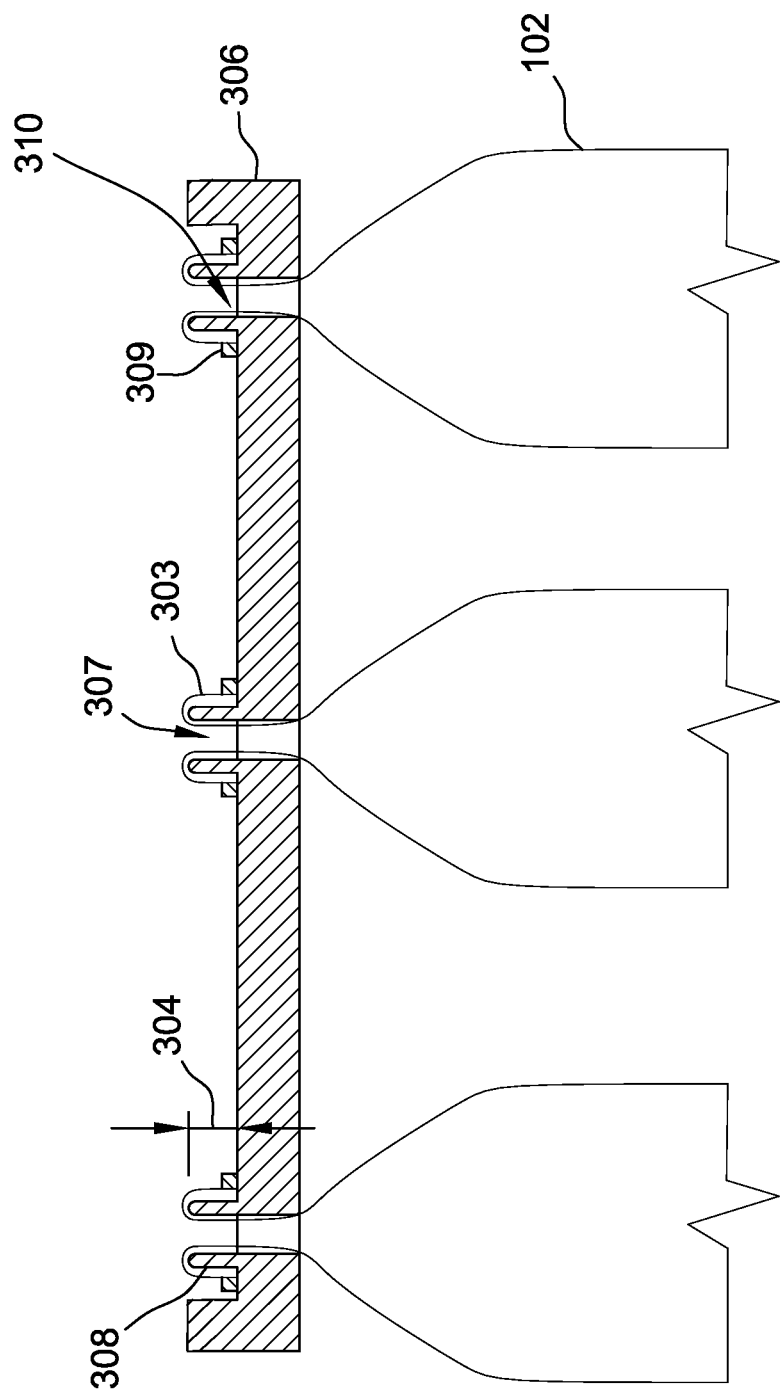
FIG. 19 is a schematic sectional view of the membrane mounting frame of FIG. 19 along lines 19-19 shown in FIG. 18 and including a plurality of membranes mounted thereto.

FIG. 15 is a schematic elevation view of another alternative flexible membrane deployment system 100 in a first deployed profile 101D. FIG. 16 is a schematic elevation view of flexible membrane deployment system 100 of FIG. 16 in a second deployed profile 101E. FIG. 17 is a schematic perspective view of an example rear mounting panel 204A of the flexible membrane deployment system of FIG. 15, and FIG. 18 is a schematic perspective view of a membrane mounting plate 306 for use with rear mounting panel 204A.

With reference to FIGS. 15-18, in the illustrated embodiment, flexible membrane deployment system 100 includes a plurality of flexible membranes 101. Each flexible membrane 101 of the plurality of flexible membranes 101 includes a perimeter 303 coupled to rear end 904 of vehicle 900, such that a respective variable-volume cavity 128 is defined between each flexible membrane 101 and rear end 904. At least one source 601 of pressurized gas 129 is coupled to vehicle 900, such as within equipment compartment 701, and in fluidic communication with the respective variable-volume cavity 128 defined by each flexible membrane 101. Moreover, flexible membrane deployment system 100 includes controller 600, such as within equipment compartment 701, operable to control a flow of the pressurized gas from the at least one source 601 to the respective variable-volume cavity 128 defined by each flexible membrane 101. For example, controller 600 includes a plurality of source valves 603 each separately responsive to commands entered via a control panel (not shown) located on the vehicle 900, such as in a cab of a tractor unit. In the illustrated embodiment, one source 601 supplies multiple valves 603. Alternatively, each of a plurality of sources 601 supplies a different group of valves 603. Similarly, in some embodiments, a single regulator (not shown), similar to regulator 602 shown in FIG. 1, controls a pressure level available at the plurality of source valve 603. Alternatively, each of a plurality of sources 601 controls the pressure level for a different group of valves 603.

More specifically, controller 600 is operable such that the plurality of flexible membranes 101 is movable between a first deployed profile 101D (shown in FIG. 15), in which the plurality of flexible membranes 101 cooperate to maintain a first pre-selected tapered aerodynamic shape projecting rearward from rear end 904 of vehicle 900, and a second deployed profile 101E (shown in FIG. 16), in which the plurality of flexible membranes 101 cooperate to maintain a second pre-selected tapered aerodynamic shape projecting rearward from rear end 904. In particular, the second pre-selected tapered aerodynamic shape is different from the first pre-selected tapered aerodynamic shape. In other words, each flexible membrane 101 is independently inflatable, and the pattern of inflation and deflation of the plurality of flexible membranes 101 establishes the cooperative deployed profile 101D or 101E. For example, first deployed profile 101D is selected to reduce an aerodynamic drag induced on vehicle 900 at a given first operating condition (e.g., a first forward travel speed) of vehicle 900, and second deployed profile 101E is selected to reduce an aerodynamic drag induced on vehicle 900 at a given second operating condition (e.g., a second forward travel speed) of vehicle 900.

It should be understood that the number and arrangement of flexible membranes 101 and the patterns of inflation and deflation illustrated in FIGS. 15 and 16 are examples only, and in no way intended to be limiting. Many other suitable numbers and arrangements of flexible membranes 101 and/or suitable patterns of inflation and deflation that, for example, establish different cooperative deployed profiles are contemplated by the disclosure.

In some embodiments, flexible membrane deployment system 100 further includes at least one vacuum pump 604 (shown in FIG. 1) in fluidic communication with the respective variable-volume cavity 128 defined by each flexible membrane 101, and operable to extract the pressurized gas 129 from the variable-volume cavity 128 such that each flexible membrane 101 is returned from first deployed profile 101D to stowed profile 101R. As discussed above, the at least one vacuum pump 604 facilitates an increased speed of deflation of each variable-volume cavity 128, such as for faster access to unloading of the trailer after arrival at a destination. Alternatively, each variable-volume cavity 128 is deflated in any suitable fashion that enables flexible membrane deployment system 100 to function as described herein. For example, each variable-volume cavity 128 is deflated by venting to atmosphere and manual pressure on an outer surface of the respective flexible membrane 101.

In the example embodiment, flexible membrane deployment system 100 includes an alternative embodiment of rear mounting panel 204, designated rear mounting panel 204A, coupled to rear end 904 of vehicle 900, and the respective perimeter 303 of each flexible membrane 101 is coupled to rear mounting panel 204A. For example, in some embodiments, flexible membrane deployment system 100 includes swing panel 203 mountable on the exterior of side wall 906 of vehicle 900, as described above, enabling rear mounting panel 204A to be moved between the first position parallel and adjacent to rear end 904 (shown in FIG. 3), and the second position parallel and adjacent to the exterior of side wall 906 (shown in FIG. 4A).

In the example embodiment, rear mounting panel 204A includes a plurality of manifolds 207 defined internally therein. Each of the plurality of manifolds 207 is in fluidic communication with a corresponding one of the plurality of regulators 602, and with a corresponding at least one cavity port, such as cavity ports 206 or 506. In turn, the at least one cavity port is in fluidic communication with the respective variable-volume cavity 128 defined by each of a corresponding subset of the plurality of flexible membranes 101.

In the example embodiment, each manifold 207 is integral to rear mounting panel 204A in the sense that rear mounting panel 204A includes one or more sets of air channels 222, 522 defined internally within rear mounting panel 204A. More specifically, a first of the plurality of manifolds 207 includes a first set of one or more air channels 222 in fluidic communication with an inlet port 209 defined on rear mounting panel 204A. In turn, inlet port 209 is configured for coupling in fluidic communication with the at least one source 601 and a first of the plurality of source valves 603. For example, inlet port 209 is again defined in bottom edge 224 of rear mounting panel 204A, and compartment 701 includes an air line (not shown) in series with the first source valve 603 that extends to rear end 904 for coupling (e.g., via a quick-disconnect connector) to inlet port 209 when rear mounting panel 204A is in the first position. Similarly, a second of the plurality of manifolds 207 includes a second set of one or more air channels 522 in fluidic communication with a second inlet port 509 defined on rear mounting panel 204A. In turn, second inlet port 209 is configured for coupling in fluidic communication with the at least one source 601 and a second of the plurality of source valves 603. For example, inlet port 509 is also defined in bottom edge 224 of rear mounting panel 204A, and compartment 701 includes a second air line (not shown) in series with the second source valve 603 that extends to rear end 904 for coupling (e.g., via a quick-disconnect connector) to inlet port 509 when rear mounting panel 204A is in the first position.

Alternatively, inlet ports 209 and/or 509 are defined at any suitable location on rear mounting panel 204A, and/or inlet ports 209 and/or 509 are configured for coupling in fluidic communication with the at least one source 601 and the respective first and second source valves 603 in any suitable fashion, that enables flexible membrane deployment system 100 to function as described herein.

In the example embodiment, the one or more air channels 222 are further in fluidic communication with at least one cavity port 206, and the one or more air channels 522 are further in fluidic communication with at least one cavity port 506. In turn, each of cavity ports 206 and 506 extend through exterior-facing surface 221 into fluidic communication with a corresponding variable-volume cavity 128 defined by the plurality of flexible membranes 101. Thus, a first manifold 207 defines a flow path for compressed air 129 from the at least one source 601, through inlet port 209, the one or more air channels 222, and the at least one cavity port 206, into the variable-volume cavities 128 associated with a first set 111 of the plurality of flexible membranes 101, and a second manifold 207 defines a flow path for compressed air 129 from the at least one source 601, through inlet port 509, the one or more air channels 522, and the at least one cavity port 506, into the variable-volume cavities 128 associated with a second set 113 of the plurality of flexible membranes 101. Alternatively, the plurality of manifolds 207 defines respective flow paths for compressed air 129 through respective source valves 603 from the at least one source 601, through rear mounting panel 204A, and into the respective variable-volume cavities 128 of sets 111 and 113 of flexible membranes 101 in any suitable fashion that enables flexible membrane deployment system 100 to function as described herein.

In some embodiments, the use of plurality of manifolds 207 integral to rear mounting panel 204A simplifies an installation of flexible membrane deployment system 100 on vehicle 900. More specifically, the installation of rear mounting panel 204A, whether using swing panel 203 or in replacement of rear cargo doors 901, simultaneously provides both a support structure for the plurality of flexible membranes 101 and pre-defined independent air flow paths between the at least one source 601 of compressed air 129 and the variable-volume cavities 128 associated with respective sets 111 and 113 of the plurality of flexible membranes 101. Accordingly, sets 111 and 113 of flexible membranes 101 are independently inflatable and deflatable to move between cooperative deployed profiles 101D and 101E. Alternatively, the plurality of manifolds 207 is other than integral to rear mounting panel 204A. For example, at least one manifold 207 is provided as a flexible conduit between the at least one source 601 and a set of variable-volume cavities 128 that is structurally separate from rear mounting panel 204.

In the example embodiment, air channels 222 of the first manifold 207 are further in fluidic communication with an outlet port 208 defined on rear mounting panel 204A, and air channels 522 of the second manifold 207 are further in fluidic communication with an outlet port 508 defined on rear mounting panel 204A. In turn, outlet ports 208 and 508 are each configured for coupling in selective fluidic communication with at least one vacuum pump (not shown) configured to extract pressurized gas 129 from the respective sets 111 and 113 of variable-volume cavities such that each flexible membrane 101 is moved from cooperating in at least one of the first and second deployed profiles 101D, 101E to cooperating in stowed profile 101R, in which each flexible membrane 101 is collapsed against rear end 904 of vehicle 900. For example, the at least one vacuum pump is positioned in equipment compartment 701 and functions with the plurality of manifolds 207 similar to as described above for vacuum pump 604 (shown in FIG. 1).

It should be understood that the number and arrangement of plurality of manifolds 207 and the patterns of cavity outlet ports 206, 506 illustrated in FIG. 17 are examples only, and in no way intended to be limiting. Many other suitable numbers and arrangements of manifolds 207 and/or suitable patterns of cavity outlet ports 206, 506 that, for example, support different numbers and arrangements of flexible membranes 101 are contemplated by the disclosure.

Membrane mounting plate 306 is configured to secure plurality of flexible membranes 101 to rear mounting panel 204A. In the example embodiment, an interior region of membrane mounting plate 306 includes a plurality of apertures 307 defined in membrane mounting plate 306 and extending therethrough. Each aperture 307 aligns with a corresponding one of cavity ports 206, 506 to receive a neck 310 of a corresponding flexible membrane 101 therethrough. Further in the example embodiment, each aperture 307 is bounded by a hollow post 308. Each hollow post 308 is configured to receive neck 310 of the corresponding flexible membrane 101 therethrough, and to further receive a folded-over portion of neck 310 of the corresponding flexible membrane 101, defining perimeter 303, against an exterior surface of post 308. Moreover, the exterior surface of each post 308 overlaid by perimeter 303 is configured to be received in an interference fit against an interior surface of the aligned one of cavity ports 206, 506 when membrane mounting plate 306 is secured to rear mounting panel 204A, thereby securing perimeter 303 of each flexible membrane 101 to rear mounting panel 204A. For example, each post 308 is configured to extend into the corresponding one of cavity ports 206, 506 by a distance 304. Alternatively, perimeter 303 of each flexible membrane 101 is secured to rear mounting panel 204A in any suitable fashion that enables flexible membrane deployment system 100 to function as described herein.

In the example embodiment, flexible membrane deployment system 100 further includes resilient O-rings 309 each configured to bias perimeter 303 of a respective flexible membrane 101 against a base of the corresponding post 308, and/or to further seal perimeter 303 after coupling of membrane mounting plate 306 to rear mounting panel 204A. Alternatively, flexible membrane deployment system 100 does not include O-rings 309.

In the example embodiment, similar to membrane mounting frame 301 discussed above, membrane mounting plate 306 includes a plurality of openings 302 arranged to register with a corresponding plurality of mounting openings 205 defined in rear mounting panel 204A. After perimeter 303 of each flexible membrane 101 is coupled to a respective post 308 as described above, suitable fasteners (not shown) are inserted into registered pairs of openings 302, 205 and tightened to further secure perimeter 303 of each flexible membrane 101 to rear mounting panel 204A. Alternatively, membrane mounting plate 306 is further secured to rear mounting panel 204A in any suitable fashion that enables flexible membrane deployment system 100 to function as described herein.

Figure 22:
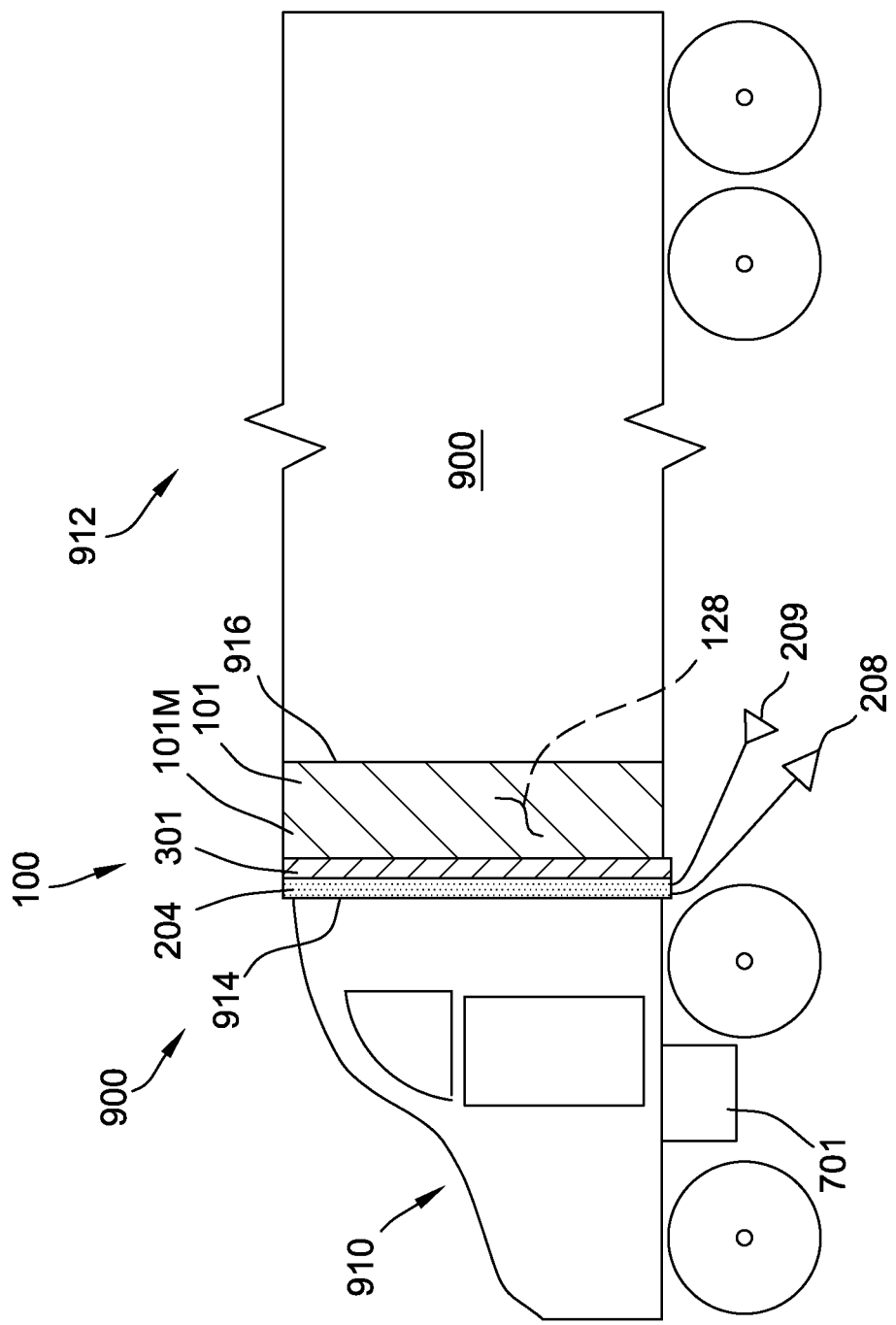
FIG. 22 is a schematic elevation view of a vehicle including another alternative flexible membrane deployment system in a first deployed profile.
Figure 23:
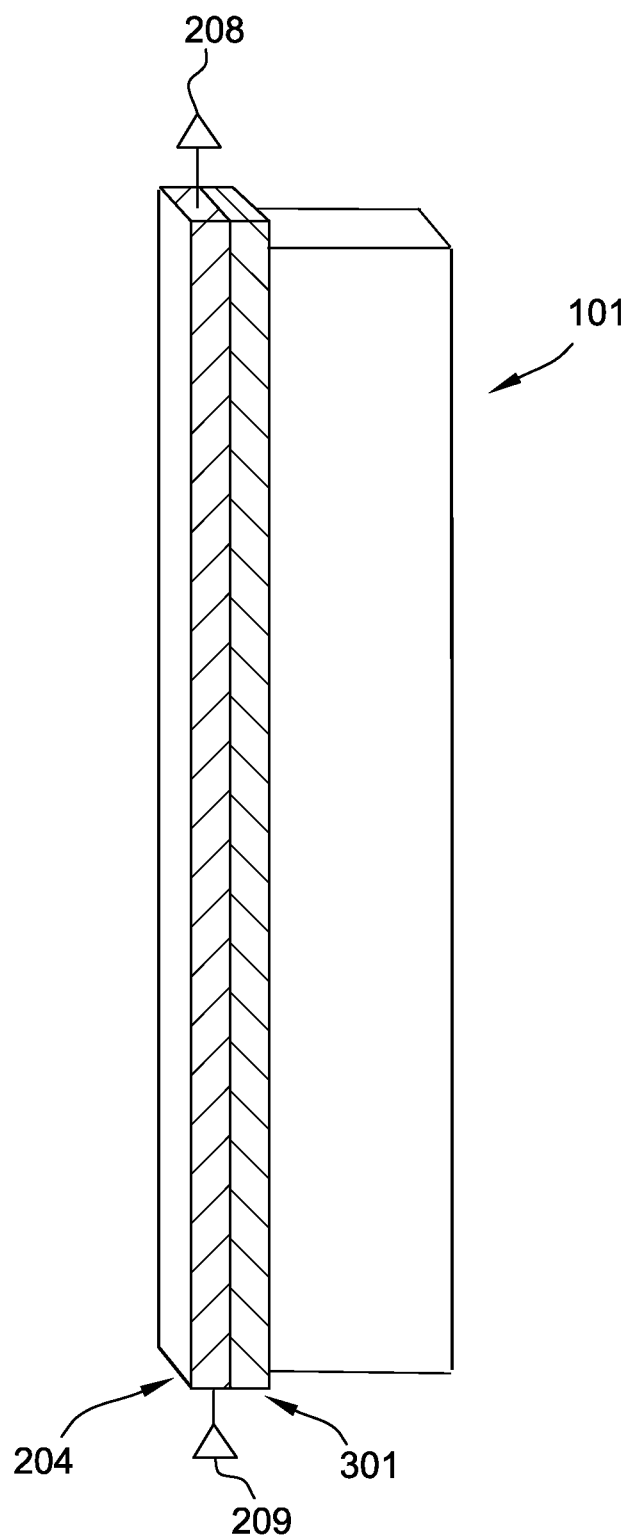
FIG. 23 is a schematic sectional elevation view of the alternative flexible membrane deployment system of FIG. 22.
Figure 24:
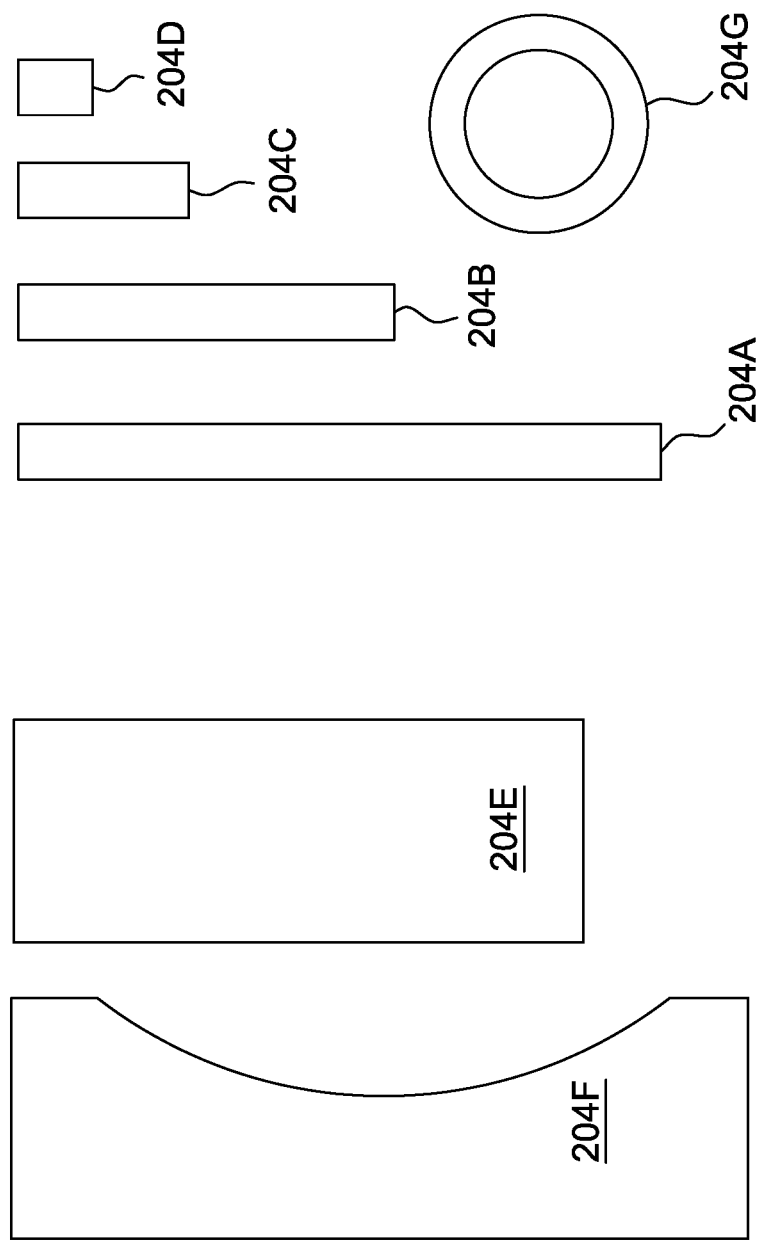
FIG. 24 is a schematic front view of multiple profiles of rear mounting panels of the alternative flexible membrane deployment system of FIG. 22.
Figure 25:
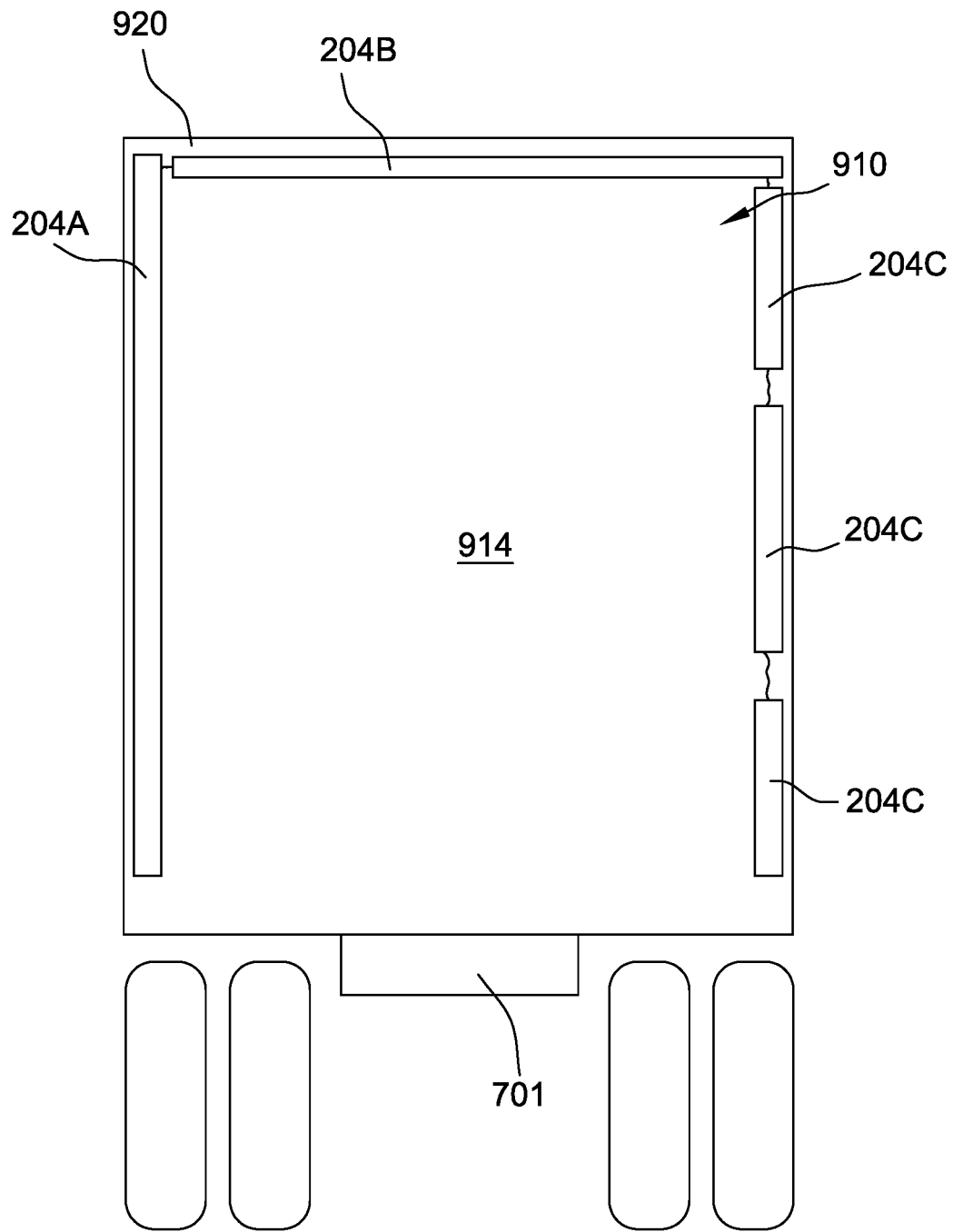
FIG. 25 is a schematic rear view of a rear end of a tractor unit including a plurality of rear mounting panels that can be used with the alternative flexible membrane deployment system of FIG. 22.

FIG. 22 is a schematic elevation view of vehicle 900 including a tractor unit 910, a trailer 912, and an alternative flexible membrane deployment system 100 in a deployed profile. FIG. 23 is a schematic view of a portion of the alternative flexible membrane deployment system 100 of FIG. 22. FIG. 24 is a schematic plan view of multiple profiles of rear mounting panel 204 that can be used with the alternative flexible membrane deployment system of FIG. 22. FIG. 25 is a schematic rear view of a rear end 914 of tractor unit 910 including a plurality of rear mounting panels 204 that can be used with the alternative flexible membrane deployment system of FIG. 22. System 100 includes at least one flexible membrane 101 coupled to rear end 914 of tractor unit 910 between tractor unit 910 and trailer 912. The at least one flexible membrane 101 is typically maintained in the deployed position during operation of vehicle 900 to reduce an aerodynamic drag induced on vehicle 900 by air flow effects in and around the gap between tractor unit 910 and trailer 912 at a given first operating condition (e.g., a first forward travel speed) of vehicle 900. The illustrated flexible membrane deployment system 100 includes elements similar to those described above, but is coupled to rear end 914 of tractor unit 910 rather than coupled to rear end 904 of vehicle 900. Moreover, the illustrated flexible membrane deployment system 100 may include one or more "thin" or "curtain" shaped flexible membranes 101 each mounted along a perimeter 920 of rear end 914. As one example, three curtain-shaped flexible membranes 101 may be mounted respectively along the left side, top, and right side of perimeter 920 of rear end 914 to provide a curtain around the gap between tractor unit 910 and trailer 912. Optionally, a fourth flexible membrane 101 may be mounted along the bottom of perimeter 920 of rear end 914. In some embodiments, such a curtained arrangement of flexible membranes 101 blocks drag-inducing airflow interaction with the gap between tractor unit 910 and trailer 912, and also reduces interference of flexible membranes 101 with a front end 916 of trailer 912 in operating conditions in which front end 916 moves relative to tractor unit 910 (for example, as the vehicle 900 negotiates wide turns or backs up along a curved path, tractor unit 910 rotates relative to trailer 912, such that one side of front end 916 rotates toward tractor unit 910 while the other side of front end 916 rotates away from tractor unit 910).

Alternatively, a single flexible membrane 101 may be mounted with its perimeter 103 generally congruent to perimeter 920 of rear end 914, similar to as shown with respect to rear end 904 of trailer 912 in FIG. 1, and a deployed profile of the single flexible membrane 101 may be configured to fill the gap between tractor unit 910 and trailer 912. For example, the deployed profile is truncated relative to the shape of flexible membrane 101 shown in FIG. 1, and generally block-shaped. In some embodiments, such a single flexible membrane 101 also blocks drag-inducing airflow interaction with the gap between tractor unit 910 and trailer 912. The single flexible membrane 101 may be sufficiently deformable in the deployed state, and/or may be tapered near front end 916, to accommodate operating conditions such as those described above in which front end 916 moves relative to tractor unit 910.

As described above, in the example embodiment, alternative flexible membrane deployment system 100 again includes controller 600 (illustrated in FIG. 1) operable to control a flow of the pressurized gas 129 from source 601 to the respective variable-volume cavity 128 within each at least one flexible membrane 101. Controller 600 is selectively operable to increase a pressure of pressurized gas 129 in each variable-volume cavity 128 such that the at least one flexible membrane 101 moves from a stowed profile (similar to stowed profile 101R illustrated in FIG. 2), in which each at least one flexible membrane 101 is collapsed against rear end 914 of tractor unit 910, to a first deployed profile 101M, in which each at least one flexible membrane 101 is maintained in a first pre-selected aerodynamic shape projecting rearward from rear end 914 towards front end 916 of trailer 912. For example, first deployed profile 101M is selected to reduce an aerodynamic drag induced on vehicle 900 at a given first operating condition (e.g., a first forward travel speed) of vehicle 900 by blocking airflow interaction with the gap between tractor unit 910 and trailer 912.

In the illustrated embodiment, the at least one flexible membrane 101 may extend from rear end 914 of tractor unit 910 into contact with a front end 916 of trailer 912, substantially blocking the gap between rear end 914 of tractor unit 910 and front end 916 of trailer 912. In some embodiments, flexible membrane 101 may also be coupled to front end 916 of trailer 912 such that flexible membrane 101 is coupled to both rear end 914 of tractor unit 910 and front end 916 of trailer 912 for added stability. For example, after controller 600 has increased a pressure of pressurized gas 129 in each variable-volume cavity 128 such that flexible membrane 101 is deployed in first deployed profile 101M, an operator may couple flexible membrane 101 to front end 916 of trailer 912 with a plurality of mechanical coupling devices (e.g. hooks, rope, etc.). In alternative embodiments, the at least one flexible membrane 101 may extend over less than an entire distance from rear end 914 of tractor unit 910 to front end 916 of trailer 912.

In the example embodiment, the illustrated flexible membrane deployment system 100 again includes at least one rear mounting panel 204 coupled to rear end 914 of tractor unit 910. As described above, perimeter 103 of each at least one flexible membrane 101 is coupled to rear end 914 of tractor unit 910 via coupling to a corresponding at least one rear mounting panel 204. Alternatively, perimeter 103 of the at least one flexible membrane 101 is coupled to rear end 914 in any suitable fashion that enables alternative flexible membrane deployment system 100 to function as described herein. Additionally, as described above, alternative flexible membrane deployment system 100 further includes at least one membrane mounting frame 301 configured to respectively secure perimeter 103 of each at least one flexible membrane 101 to the corresponding rear mounting panel 204. Additionally, as described above with respect to FIG. 11, each at least one rear mounting panel 204 includes a respective manifold 207 integral to rear mounting panel 204 and in fluidic communication with source 601 via a respective inlet port 209, and with vacuum pump 604 via a respective outlet port 208. Source 601 and vacuum pump 604 pressurize and depressurize variable-volume cavity 128 of each at least one flexible membrane 101 as described above.

In some embodiments, rear mounting panel 204 is removably attached to existing rear end 914 of tractor unit 910 in any manner that accommodates mounting to conventional tractor units 910. For example, as illustrated in FIG. 25, a plurality of rear mounting panels 204 may be mounted along perimeter 920 of rear end 914 of tractor unit 910, each having a respective manifold 207 in flow communication with source 601. A respective curtain-type flexible membrane 101 may then be coupled to each rear mounting panel 204, enabling source 601 to pressurize and depressurize each respective variable-volume cavity 128 as described above. Each rear mounting panel 204 may have a different shape to cooperate with respective flexible membranes 101 having different shapes.

In some embodiments, flexible membranes 101 are selected to have a particular cross-sectional shape (e.g., in a plane normal to a length of trailer 912), and each rear mounting panel 204 has a shape corresponding to the cross-sectional shape of the flexible membrane 101 to accommodate coupling to perimeter 103. For example, as illustrated in FIG. 25, alternative flexible membrane deployment system 100 may include a plurality of rectangular rear mounting panels 204A-D of varying lengths around perimeter 920 of rear end 914 of tractor unit 910. Rectangular rear mounting panels 204A-D enable a series of flexible membranes 101 having thin, elongated rectangular profiles (e.g., as shown in FIG. 23) to create a curtain around perimeter 920 of rear end 914 of tractor unit 910, blocking airflow interaction with the gap between rear end 914 and front end 916 of trailer 912 and, therefore, reducing aerodynamic drag induced on vehicle 900 at a given first operating condition (e.g., a first forward travel speed) of vehicle 900.

In an alternative embodiment, alternative flexible membrane deployment system 100 may include one or more broader rectangular rear mounting panels 204E, and the corresponding one or more flexible membranes create a relatively thicker curtain around perimeter 920. For example, the thicker flexible membranes 101 may exhibit more stability during deployment at a given operating speed of vehicle 900. In another alternative embodiment, the broader rectangular rear mounting panels 204E substantially cover rear end 914 of tractor unit 910. The corresponding one or more flexible membranes 101 are shaped to fill a substantial portion of the gap between rear end 914 and front end 916 of trailer 912, rather than merely forming a curtain around the gap, in order to reduce airflow interaction. In another alternative embodiment, alternative flexible membrane deployment system 100 may include one or more rear mounting panels 204F having partially curved profiles, positioned around perimeter 920 of rear end 914 of tractor unit 910. For example, two rear mounting panels 204F may be mounted to opposite sides of perimeter 920 in a mirrored arrangement such that the two curved portions face each other. The corresponding partially curved profiles of curtain-type flexible membranes 101 fill a portion of the gap between rear end 914 and front end 916 of trailer 912, while still leaving space to accommodate relative movement between front end 916 of trailer 912 and rear end 914, as discussed above. In yet another alternative embodiment, alternative flexible membrane deployment system 100 may include a single circular rear mounting panel 204G positioned on rear end 914 of tractor unit 910. In this embodiment, trailer 912 is a tanker trailer, and a cylindrical curtain shape of the corresponding flexible membrane 101 extends to meet the cylindrical shape of the tanker trailer to block airflow interaction with the gap between rear end 914 and circular front end 916 of trailer 912. Alternatively, the single circular rear mounting panel 204G may be separated into a plurality of arcuate rear mounting panels (not shown), and the corresponding flexible membranes 101 cooperate to define a cylindrical curtain.

In some embodiments in which alternative flexible membrane deployment system 100 is mounted on tractor unit 910, controller 600 including source 601 and vacuum pump 604 is positioned in compartment 701 (shown in FIGS. 22 and 25). Compartment 701 is positioned below tractor unit 910 and is coupled in fluidic communication with rear mounting panels 204 via outlet port 208 and inlet port 209. Controller 600 is responsive to commands entered via a control panel (not shown) located on tractor unit 910, such as in a cab of a tractor unit 910.

Figure 26:
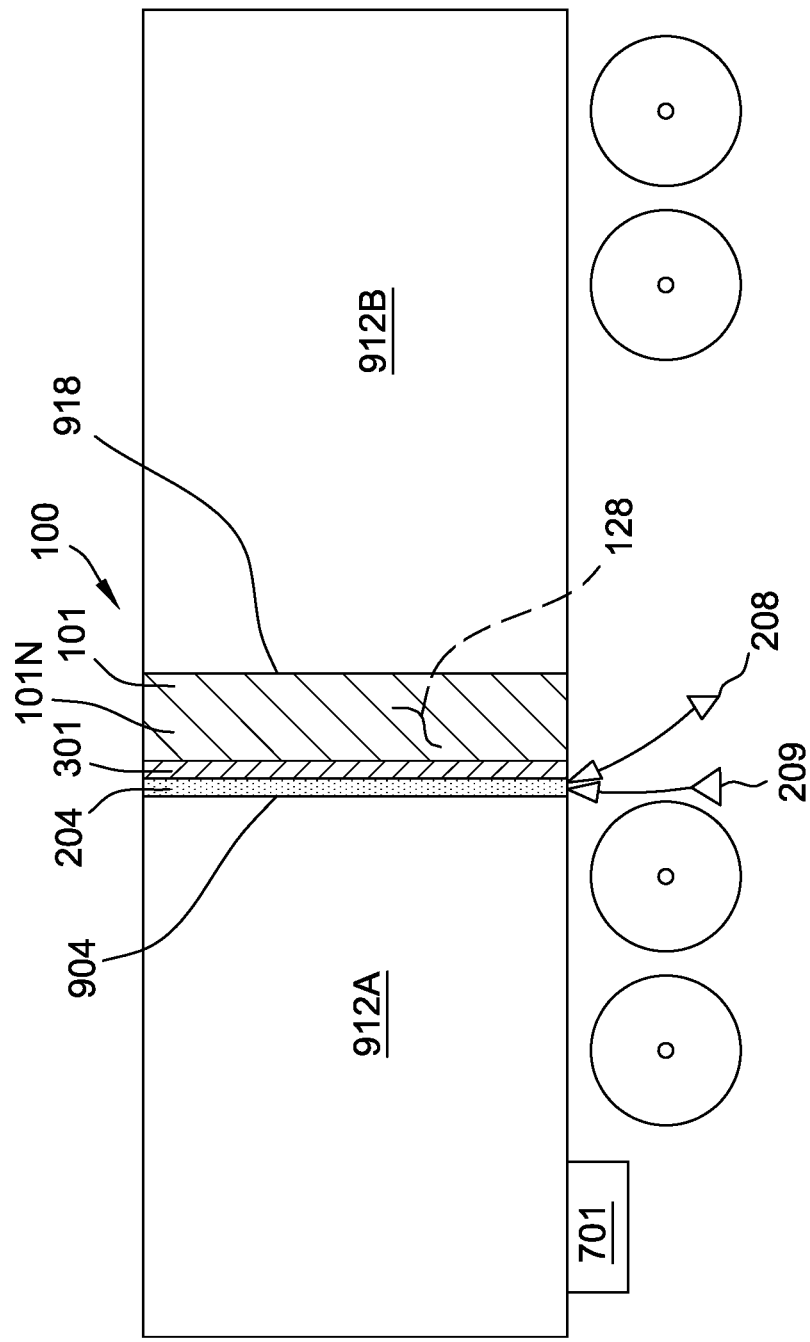
FIG. 26 is a schematic elevation view of a vehicle including a first trailer, a second trailer, and another alternative flexible membrane deployment system in a deployed profile between the first and second trailers.

FIG. 26 is a schematic elevation view of vehicle 900 in a tandem trailer configuration including a first trailer 912A, a second trailer 912B, and another alternative flexible membrane deployment system 100 in a deployed profile between first and second trailers 912A and 912B. System 100 includes at least one flexible membrane 101 coupled to rear end 904 of first trailer 912A between first and second trailers 912A and 912B. The at least one flexible membrane 101 is typically maintained in the deployed position during operation of vehicle 900 to reduce an aerodynamic drag induced on vehicle 900 by air flow effects in and around a gap between rear end 904 and a front end 918 of second trailer 912B at a given first operating condition (e.g., a first forward travel speed) of vehicle 900. The illustrated flexible membrane deployment system 100 includes elements similar to those described above, but is coupled to rear end 904 of first trailer 912A between first and second trailers 912A and 912B, rather than coupled to a free rear end 904 of vehicle 900 or to rear end 914 of tractor unit 910. Moreover, the illustrated flexible membrane deployment system 100 may include one or more "thin" or "curtain" shaped flexible membranes 101 each mounted along a perimeter of rear end 904. As one example, three curtain-shaped flexible membranes 101 may be mounted respectively along the left side, top, and right side of the perimeter of rear end 904, similar to the arrangement shown in FIG. 25 for rear end 914, to provide a curtain around the gap between first trailer 912A and second trailer 912B. Optionally, a fourth flexible membrane 101 may be mounted along the bottom of the perimeter of rear end 904. In some embodiments, such a curtained arrangement of flexible membranes 101 blocks drag-inducing airflow interaction with the gap between rear end 904 and front end 918 of second trailer 912B, and also reduces interference of flexible membranes 101 with front end 918 of second trailer 912B in operating conditions in which front end 918 moves relative to rear end 904 of first trailer 912A (for example, as the vehicle 900 negotiates wide turns or backs up along a curved path, second trailer 912B rotates relative to first trailer 912A, such that one side of front end 918 rotates toward first trailer 912A while the other side of front end 918 rotates away from first trailer 912A).

Alternatively, a single flexible membrane 101 may be mounted with its perimeter 103 generally congruent to the perimeter of rear end 904, similar to as shown in FIG. 1, and a deployed profile of the single flexible membrane 101 is configured to fill the gap between first trailer 912A and second trailer 912B. For example, the deployed profile is truncated relative to the shape of flexible membrane 101 shown in FIG. 1, and generally block-shaped. In some embodiments, such a single flexible membrane 101 also blocks drag-inducing airflow interaction with the gap between gap between rear end 904 and second trailer 912B. The single flexible membrane 101 may be sufficiently deformable in the deployed state, and/or may be tapered near front end 918, to accommodate operating conditions such as those described above in which front end 918 moves relative to first trailer 912A.

In the example embodiment, alternative flexible membrane deployment system 100 again includes controller 600 (illustrated in FIG. 1) as described above, operable to control a flow of the pressurized gas 129 from source 601 to the respective variable-volume cavity 128 within each at least one flexible membrane 101. Controller 600 is selectively operable to increase a pressure of pressurized gas 129 in each variable-volume cavity 128 such that the at least one flexible membrane 101 moves from a stowed profile (similar to stowed profile 101R illustrated in FIG. 2), in which each at least one flexible membrane 101 is collapsed against rear end 914 of first trailer 912A, to a first deployed profile 101N, in which the at least one flexible membrane 101 is maintained in a first pre-selected aerodynamic shape projecting rearward from rear end 904 of first trailer 912A towards front end 918 of second trailer 912B. For example, first deployed profile 101N is selected to reduce an aerodynamic drag induced on vehicle 900 at a given first operating condition (e.g., a first forward travel speed) of vehicle 900 by blocking airflow interaction with the gap between first trailer 912A and second trailer 912B.

In the illustrated embodiment, the at least one flexible membrane 101 may extend from rear end 904 of first trailer 912A into contact with front end 918 of trailer 912B, substantially blocking the gap between rear end 904 of first trailer 912A and front end 918 of second trailer 912B. In some embodiments, flexible membrane 101 may also be coupled to front end 918 of second trailer 912B such that flexible membrane 101 is coupled to both rear end 904 of first trailer 912A and front end 918 of second trailer 912B for added stability. For example, after controller 600 has increased a pressure of pressurized gas 129 in each variable-volume cavity 128 such that the at least one flexible membrane 101 is deployed in first deployed profile 101N, an operator may couple flexible membrane 101 to front end 918 of second trailer 912B with a plurality of mechanical coupling devices (e.g. hooks, rope, etc.). In alternative embodiments, the at least one flexible membrane 101 may extend over less than an entire distance from rear end 904 of first trailer 912A to front end 918 of second trailer 912B.

In the example embodiment, the illustrated flexible membrane deployment system 100 again includes at least one rear mounting panel 204 coupled to rear end 904 of first trailer 912A. As described above, perimeter 103 of each at least one flexible membrane 101 is coupled to rear end 904 of first trailer 912A via coupling to a corresponding at least one rear mounting panel 204. Alternatively, perimeter 103 of the at least one flexible membrane 101 is coupled to rear end 904 in any suitable fashion that enables alternative flexible membrane deployment system 100 to function as described herein. Additionally, as described above, alternative flexible membrane deployment system 100 further includes at least one membrane mounting frame 301 configured to respectively secure perimeter 103 of each at least one flexible membrane 101 to the corresponding rear mounting panel 204. Additionally, as described above with respect to FIG. 11, each at least one rear mounting panel 204 includes a respective manifold 207 integral to rear mounting panel 204 and in fluidic communication with source 601 via a respective inlet port 209, and with vacuum pump 604 via a respective outlet port 208. Source 601 and vacuum pump 604 pressurize and depressurize variable-volume cavity 128 of each at least one flexible membrane 101 as described above. One or more rear mounting panels 204 may be movably coupled over one or both rear doors 901 of first trailer 912A. For example, a plurality of rear mounting panels 204 are arranged on a plate (not shown) that is hingedly connected to swing panel 203, as shown in FIGS. 3 and 4, for selective positioning over rear doors 901 during travel, and along a side of first trailer 912A during loading/unloading. Alternatively, one or more rear mounting panels 204 may be integrally formed in rear doors 901 and/or a rear frame of first trailer 912A.

In some embodiments, rear mounting panel 204 is attached to rear end 904 similar to as described above. For example, a plurality of rear mounting panels 204 may be mounted along the perimeter of rear end 904 of first trailer 912A, each having a respective manifold 207 in flow communication with source 601, similar to the arrangement illustrated in FIG. 25 for rear end 914 of tractor unit 910. A respective curtain-type flexible membrane 101 may then be coupled to each rear mounting panel 204, enabling source 601 to pressurize and depressurize each respective variable-volume cavity 128 as described above. Each rear mounting panel 204 may have a different shape to cooperate with respective flexible membranes 101 having different shapes. In some embodiments, flexible membranes 101 are selected to have a particular cross-sectional shape (e.g., in a plane normal to a length of second trailer 912B), and each rear mounting panel 204 has a shape corresponding to the cross-sectional shape of the flexible membrane 101 to accommodate coupling to perimeter 103, for example similar to the shapes and arrangements discussed above with respect to rear mounting panels 204A-G. As discussed above, arrangements of flexible membranes 101 having thin profiles may be used to create a curtain around the perimeter of rear end 904 of first trailer 912A, blocking airflow interaction with the gap between rear end 904 and front end 918 of second trailer 912B, while flexible membranes having thicker profiles may be used to substantially fill the gap, also blocking airflow interaction with the gap.

In some embodiments in which alternative flexible membrane deployment system 100 is mounted on rear end 904 of first trailer 912A, controller 600 including source 601 and vacuum pump 604 is positioned in compartment 701 (shown in FIG. 2) and is responsive to commands entered via a control panel (not shown) located on tractor unit 910, such as in a cab of a tractor unit 910.

Figure 27:
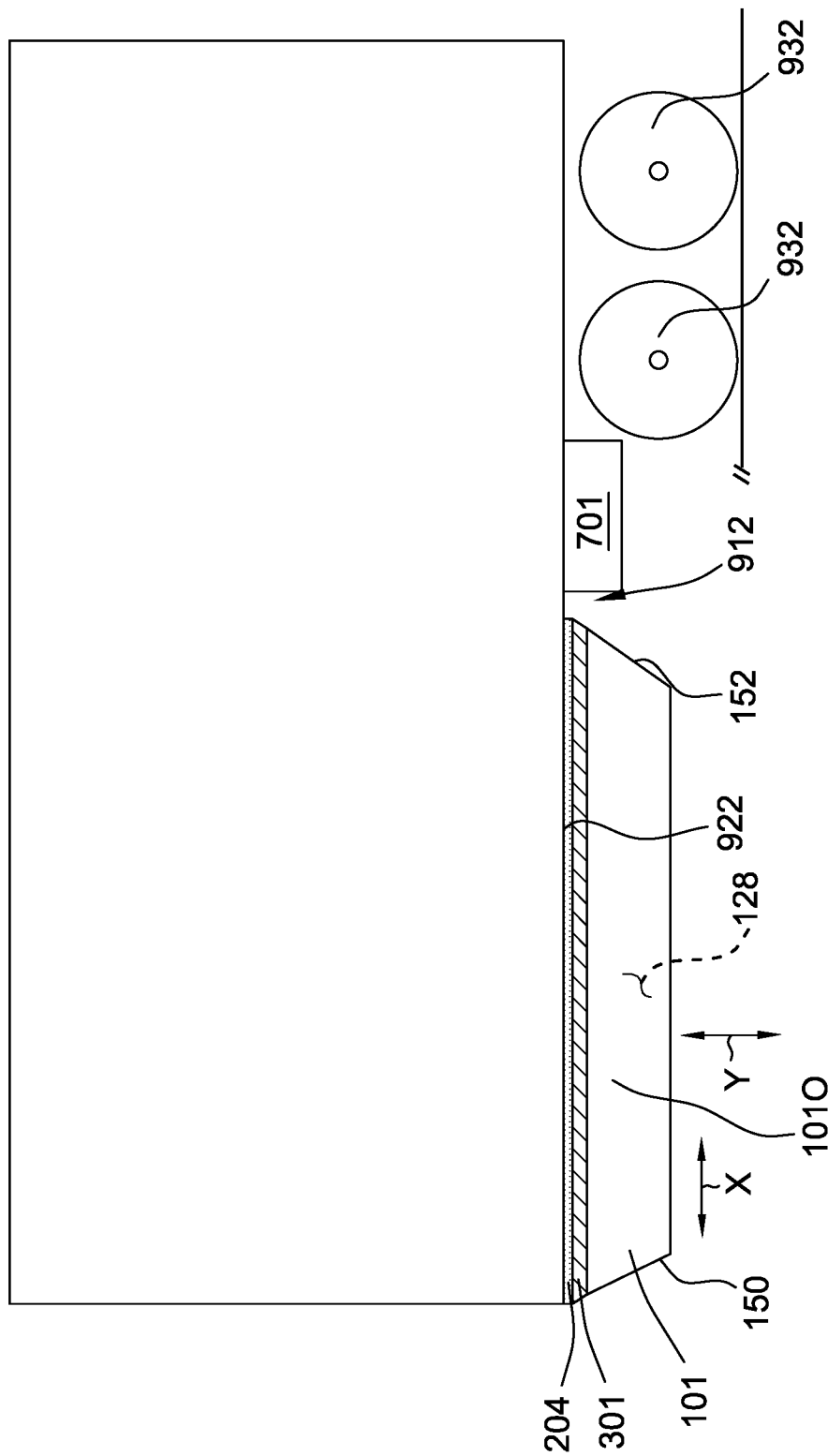
FIG. 27 is a schematic elevation view of a vehicle including a trailer and another alternative flexible membrane deployment system in a deployed profile.

FIG. 27 is a schematic elevation view of vehicle 900 including trailer 912 and another alternative flexible membrane deployment system 100 in a deployed profile. FIG. 28 is a schematic sectional elevation view of a flexible membrane 101 of the alternative flexible membrane deployment system 100 of FIG. 27 in a deployed profile. System 100 includes at least one flexible membrane 101 coupled to a bottom 922 of trailer 912. Flexible membrane 101 is typically maintained in the deployed position during operation of vehicle 900 to reduce an aerodynamic drag induced on vehicle 900 by air flow effects in and around a gap between bottom 922 of trailer 912 and the road surface at a given first operating condition (e.g., a first forward travel speed) of vehicle 900. The illustrated flexible membrane deployment system 100 includes elements similar to those described above, but is coupled to bottom 922 of trailer 912 rather than rear end 904 or rear end 914.

The illustrated flexible membrane deployment system 100 again may include one or more "thin" or "curtain" shaped flexible membranes 101 each mounted along a perimeter of bottom 922 in a skirt configuration. As one example, the at least one flexible membrane 101 includes a first curtain-type flexible membrane 101 positioned on a left side of bottom 922 of trailer 912 and a second curtain-type to provide a skirt around the gap between bottom 922 and a road surface upon which vehicle 900 travels. Optionally, front and/or back flexible membranes 101 also may be mounted along the perimeter of bottom 922. In some embodiments, such a skirt arrangement of flexible membranes 101 blocks drag-inducing airflow interaction with the gap between bottom 922 of trailer 912 and the road surface.

As described above, alternative flexible membrane deployment system 100 again includes controller 600 (illustrated in FIG. 1) as described above, operable to control a flow of the pressurized gas 129 from source 601 to the respective variable-volume cavity 128 within each at least one flexible membrane 101. Controller 600 is selectively operable to increase a pressure of pressurized gas 129 in each variable-volume cavity 128 such that the at least one flexible membrane 101 moves from a stowed profile (similar to stowed profile 101R illustrated in FIG. 2), in which each at least one flexible membrane 101 is collapsed against bottom 922 of trailer 912, to a first deployed profile 101O, in which the at least one flexible membrane 101 is maintained in a first pre-selected aerodynamic shape projecting downward from bottom 922 of trailer 912 towards the road surface. For example, first deployed profile 101O is selected to reduce an aerodynamic drag induced on vehicle 900 at a given first operating condition (e.g., a first forward travel speed) of vehicle 900 by blocking airflow interaction with the gap between bottom 922 of trailer 912 and the road surface.

In the illustrated embodiment, each at least one flexible membrane 101 may extend from bottom 922 of trailer 912 toward the road surface along vertical direction Y illustrated in FIGS. 27 and 28, occupying at least some of the gap between bottom 922 of trailer 912 and the road surface. Additionally, each at least one flexible membrane 101 extends along longitudinal direction X illustrated in FIGS. 27 and 28 from front end 916 of trailer 912 towards rear end 904 of trailer 912, and has a thickness defined in a lateral direction Z.

In the example embodiment, each at least one flexible membrane 101 may have a cross-sectional profile in the Y-Z plane selected to reduce an aerodynamic drag induced on vehicle 900 at a given first operating condition (e.g., a first forward travel speed) of vehicle 900, while maintaining stability of flexible membrane 101. For example, in some embodiments, flexible membrane 101 may have a square or rectangular profile 101Q in the Y-Z plane. For another example, flexible membrane 101 may have a concave profile 1015 in the Y-Z plane. In addition, the cross-sectional profile in the Y-Z plane may vary along longitudinal direction X. For example, a front end 150 and a rear end 152 of each at least one flexible membrane 101 are tapered in the Y-Z plane to reduce an aerodynamic drag induced on vehicle 900 at a given first operating condition (e.g., a first forward travel speed) of vehicle 900, as compared to blunt front and rear ends. In the illustrated embodiment, front end 150 tapers forward along the X direction, and rear end 152 tapers rearward along the X-direction. In alternative embodiments, each at least one flexible membrane 101 has any suitable cross-sectional profile in the Y-Z plane that enables alternative flexible membrane deployment system 100 to function as described herein.

In the example embodiment, the illustrated flexible membrane deployment system 100 again includes at least one "rear" mounting panel 204, but here coupled to bottom 922 rather than rear end 904 of trailer 912. Perimeter 103 of each at least one flexible membrane 101 is coupled to bottom 922 of trailer 912 via coupling to a corresponding at least one mounting panel 204. Alternatively, perimeter 103 of the at least one flexible membrane 101 is coupled to bottom 922 in any suitable fashion that enables alternative flexible membrane deployment system 100 to function as described herein. Additionally, as described above, alternative flexible membrane deployment system 100 further includes at least one membrane mounting frame 301 configured to respectively secure perimeter 103 of each at least one flexible membrane 101 to the corresponding rear mounting panel 204. Additionally, as described above with respect to FIG. 11, each at least one mounting panel 204 includes a respective manifold 207 integral to rear mounting panel 204 and in fluidic communication with source 601 via a respective inlet port 209, and with vacuum pump 604 via a respective outlet port 208. Source 601 and vacuum pump 604 pressurize and depressurize variable-volume cavity 128 of each at least one flexible membrane 101 as described above.

In some embodiments, "rear" mounting panel 204 is attached to bottom 922 similar to as described above with respect to rear end 904. For example, a plurality of mounting panels 204 may be mounted along the perimeter of bottom 922 of trailer 912, each having a respective manifold 207 in flow communication with source 601, similar to the arrangement illustrated in FIG. 25 for rear end 914 of tractor unit 910. A respective curtain-type flexible membrane 101 may then be coupled to each mounting panel 204, enabling source 601 to pressurize and depressurize each respective variable-volume cavity 128 as described above. Each mounting panel 204 may have a different shape to cooperate with respective flexible membranes 101 having different shapes. In some embodiments, flexible membranes 101 are selected to have a particular cross-sectional shape (e.g., in a plane normal to a height of trailer 912), and each mounting panel 204 has a shape corresponding to the cross-sectional shape of the flexible membrane 101 to accommodate coupling to perimeter 103, for example similar to the shapes and arrangements discussed above with respect to rear mounting panels 204A-G. As discussed above, arrangements of flexible membranes 101 having thin profiles may be used to create a skirt around the perimeter of bottom 922 of trailer 912, blocking airflow interaction with the gap between bottom 922 and the road surface.

In some embodiments in which alternative flexible membrane deployment system 100 is mounted on bottom 922 of trailer 912, controller 600 including source 601 and vacuum pump 604 is positioned in compartment 701 (shown in FIG. 2) and is responsive to commands entered via a control panel (not shown) located on tractor unit 910, such as in a cab of a tractor unit 910.

Figure 29:
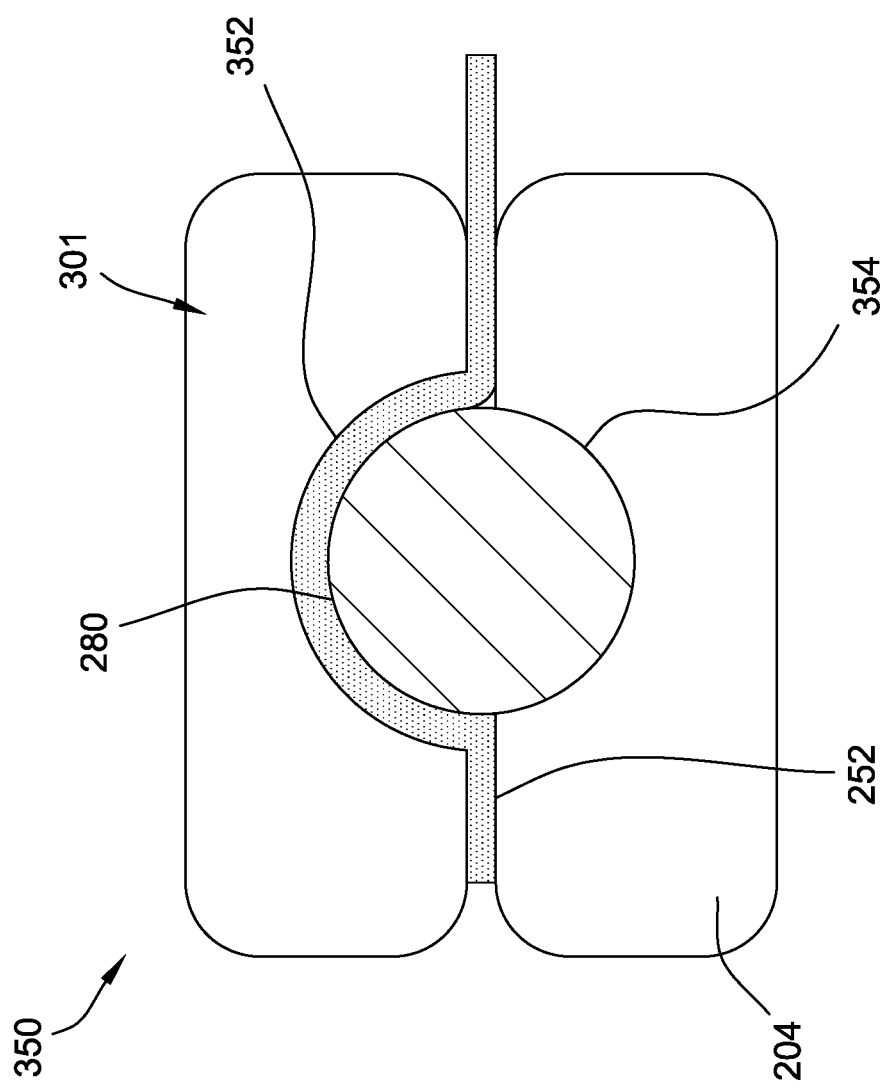
FIG. 29 is a schematic view of an air-tight seal.

FIG. 29 is a schematic view of flexible membrane 101, membrane mounting frame 301, an O-ring 280, and rear mounting panel 204 forming an air-tight seal 350 of variable-volume cavity 128. FIG. 30 is an exploded schematic view of air-tight seal 350 of FIG. 30. A portion of the flexible material used to form flexible membrane 101 is compressed between membrane mounting frame 301 and panel perimeter region 252, and this portion functions as a compressible sealing material that facilitates an air-tight seal of variable-volume cavity 128 around perimeter 103. Specifically, a frame groove 352 is formed in membrane mounting frame 301 and/or a panel groove 354 is formed in panel perimeter region 252 of rear mounting panel 204. O-ring 280 and the compressed portion of the flexible material are positioned in the groove to facilitate forming an air-tight seal 350 of variable-volume cavity 128 around perimeter 103.

FIG. 31 is a schematic view of an alternative air-tight seal 350. In the illustrated embodiment, membrane mounting frame 301 and panel perimeter region 252 do not include panel groove 354 or frame groove 352. Rather, a portion of the flexible material used to form flexible membrane 101 is compressed directly between membrane mounting frame 301 and panel perimeter region 252, and this portion functions as a compressible sealing material that facilitates an air-tight seal 350 of variable-volume cavity 128 around perimeter 103.

The above-described embodiments of a flexible membrane deployment system overcome at least some disadvantages of known systems for reducing aerodynamic drag on a vehicle, such as a semi-trailer. Specifically, the system is actuated in a fashion that is independent of vehicle speed to actively change the rear profile of the vehicle among a number of different shapes. Also specifically, in some embodiments, the system includes a rear mounting panel that simultaneously provides both a support structure for a flexible membrane and a pre-defined air flow path between a source of compressed air and a variable-volume cavity defined by the membrane.

Exemplary embodiments of a flexible membrane deployment system are described above in detail. The methods and apparatus are not limited to the specific embodiments described herein, but rather, components of systems and/or steps of the method may be utilized independently and separately from other components and/or steps described herein. For example, the methods and apparatus may also be used in combination with other vehicles, and are not limited to practice with only a semi-trailer as described herein.

Although specific features of various embodiments of the disclosure may be shown in some drawings and not in others, this is for convenience only. Moreover, references to "the example embodiment" or "some embodiments" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle comprising:
    a tractor unit having a rear end;
    a trailer having a front, said trailer coupled to said tractor unit;
    a plurality of flexible membranes arranged around a perimeter of said rear end, wherein a perimeter of each of said flexible membranes is coupled to said rear end, wherein a seal is formed between said perimeter of each of said flexible membranes and said rear end;
    a pressurization source; and
    a plurality of ports coupled to said rear end, each of said ports enclosed by said perimeter of one of said flexible membranes, each of said ports in fluidic communication with said pressurization source, wherein, in a deployed profile, said plurality of flexible membranes extends between said perimeter of said rear end of said tractor unit and said front of said trailer.

2. The vehicle according to claim 1 further comprising at least one rear mounting panel removably coupled to said rear end, wherein each of said plurality of flexible membranes is coupled to said at least one rear mounting panel.

3. The vehicle according to claim 2, wherein said at least one rear mounting panel comprises a plurality of rear mounting panels arranged around at least three sides of said perimeter of said rear end.

4. The vehicle according to claim 2, further comprising at least one membrane mounting frame, wherein said perimeter of each said plurality of flexible membranes is compressed between said at least one membrane mounting frame and said at least one rear mounting panel.

5. The vehicle according to claim 1, wherein said pressurization source comprises an electrically driven air compressor coupled to said tractor unit.

6. The vehicle according to claim 1, wherein said plurality of flexible membranes are shaped, in the deployed profile, to form a curtain around a gap between said rear end of said tractor unit and said front of said trailer.

7. The vehicle according to claim 1, further comprising a vacuum pump in fluidic communication with said ports.

8. The vehicle according to claim 1, wherein said trailer has a generally cylindrical shape, and said plurality of flexible membranes has a deployed profile configured to form a cylindrical curtain around a gap between said rear end of said tractor unit and said front of said trailer.

9. The vehicle according to claim 1, wherein said rear end further comprises a manifold defined internally therein, said manifold in fluidic communication between said pressurization source and said plurality of ports.

10. A vehicle comprising:
a first trailer having a rear end;
a second trailer having a front, said second trailer coupled to said first trailer;
a plurality of flexible membranes arranged around a perimeter of said rear end, wherein a perimeter of each of said flexible membranes is coupled to said rear end, wherein a seal is formed between said perimeter of each of said flexible membranes and said rear end;
a pressurization source; and
a plurality of ports coupled to said rear end, each of said ports enclosed by said perimeter of one of said flexible membranes and in fluidic communication with said pressurization source, wherein, in a deployed profile, said plurality of flexible membranes extends between said perimeter of said rear end of said first trailer and said front of said second trailer.

11. The vehicle according to claim 10, wherein said rear end comprises at least one rear mounting panel, wherein each of said plurality of flexible membranes is coupled to said at least one rear mounting panel.

12. The vehicle according to claim 11, wherein said at least one rear mounting panel comprises a plurality of rear mounting panels arranged around at least three sides of said perimeter of said rear end.

13. The vehicle according to claim 11, further comprising at least one membrane mounting frame, wherein said perimeter of each of said plurality of flexible membranes is compressed between said at least one membrane mounting frame and said at least one rear mounting panel.

14. The vehicle according to claim 10, wherein said plurality of flexible membranes is shaped, in the deployed profile, to form a curtain around a gap between said rear end of said first trailer and said front of said second trailer.

15. The vehicle according to claim 10, further comprising a vacuum pump in fluidic communication with said ports.

16. The vehicle according to claim 11, wherein said rear end further comprises a manifold defined internally therein, said manifold in fluidic communication between said pressurization source and plurality of ports.

17. A vehicle comprising:
a trailer having a bottom and at least one wheel extending from said bottom;
a plurality of flexible membranes arranged around a perimeter of said bottom, wherein a perimeter of each of said flexible membranes is coupled to said bottom, wherein a seal is formed between said perimeter of each of said flexible membranes and said bottom;
a pressurization source coupled to said vehicle; and
a plurality of ports coupled to said bottom, each of said plurality of ports enclosed by said perimeter of one of said flexible membranes and in fluidic communication with said pressurization source, wherein, in a deployed profile, said plurality of flexible membranes extends from said perimeter of said bottom of said trailer towards a road surface.

18. The vehicle according to claim 17, wherein said bottom comprises a plurality of mounting panels arranged along left and right sides of said perimeter of said bottom, wherein each of said plurality of flexible membranes is coupled to a corresponding one of said plurality of mounting panels.

19. The vehicle according to claim 17, wherein said plurality of flexible membranes is shaped, in the deployed profile, to form a skirt around a gap between said bottom and the road surface.

20. The vehicle according to claim 17, wherein each of said plurality of flexible membranes has a cross-sectional profile, in a plane normal to a longitudinal direction of said trailer, that varies along the longitudinal direction.

\* \* \* \* \*